(12) United States Patent
Millar et al.

(10) Patent No.: US 11,071,266 B2
(45) Date of Patent: Jul. 27, 2021

(54) DEVICES, SYSTEMS, AND METHODS FOR PROVIDING AND USING ONE OR MORE PRESSURE VALVES IN AN ASSEMBLY LINE GROW POD

(71) Applicant: Grow Solutions Tech LLC, Lehi, UT (US)

(72) Inventors: Gary Bret Millar, Highland, UT (US); Kevin Hurst, Pleasant Grove, UT (US)

(73) Assignee: GROW SOLUTIONS TECH LLC, Vineyard, UT (US)

( * ) Notice: Subject to any disclaimer, the term of this patent is extended or adjusted under 35 U.S.C. 154(b) by 389 days.

(21) Appl. No.: 15/965,297

(22) Filed: Apr. 27, 2018

(65) Prior Publication Data

US 2018/0359967 A1    Dec. 20, 2018

Related U.S. Application Data

(60) Provisional application No. 62/519,437, filed on Jun. 14, 2017, provisional application No. 62/519,425, (Continued)

(51) Int. Cl.
| | |
|---|---|
| *A01G 27/00* | (2006.01) |
| *A01G 25/16* | (2006.01) |
| *A01G 31/04* | (2006.01) |

(52) U.S. Cl.
CPC .......... *A01G 27/001* (2013.01); *A01G 25/16* (2013.01); *A01G 27/003* (2013.01); *A01G 31/042* (2013.01)

(58) Field of Classification Search
CPC .............................................. Y10T 137/7878
(Continued)

(56) References Cited

U.S. PATENT DOCUMENTS 2,152,254 A * 3/1939 Hansen .................. A01G 31/02
                                                              47/62 N
2,812,107 A * 11/1957 De Young ............... E02B 13/02
                                                              222/20
(Continued)

FOREIGN PATENT DOCUMENTS

CA    2770013 A1 * 9/2012 ......... G05D 16/2013
CN    206949155 U    7/2017
(Continued)

OTHER PUBLICATIONS

International Search Report and the Written Opinion pertaining to International Application No. PCT/US2018/030879 dated Aug. 2, 2018.

*Primary Examiner* — Magdalena Topolski
*Assistant Examiner* — Morgan T Barlow
(74) *Attorney, Agent, or Firm* — Dinsmore & Shohl LLP

(57) ABSTRACT

Devices, systems, and methods for providing and operating a valve control module and pressure valves in an assembly line grow pod are provided herein. Some embodiments include an assembly line grow pod having a plurality of fluid lines fluidly coupled between a fluid source and a fluid destination within the assembly line grow pod, a plurality of pressure valves, each coupled to a fluid line such that fluid pressure in the fluid lines is selectively controlled by the pressure valves, and a master controller communicatively coupled to the pressure valves. The master controller is programmed to receive information relating to fluid delivery within the assembly line grow pod, determine one or more pressure valves to direct the fluid, determine pressure valve parameters for each of the pressure valves that achieve the fluid pressurization, and transmit one or more control signals to the pressure valves for pressurizing the fluid within the assembly line grow pod.

17 Claims, 11 Drawing Sheets

Related U.S. Application Data filed on Jun. 14, 2017, provisional application No. 62/519,419, filed on Jun. 14, 2017.

(58) Field of Classification Search
USPC .................................................. 137/524, 530
See application file for complete search history.

(56) References Cited

U.S. PATENT DOCUMENTS

| | | | | |
|---|---|---|---|---|
| 3,143,137 | A * | 8/1964 | Muller | F16L 37/44 137/552 |
| 3,255,774 | A * | 6/1966 | Gallagher | F16K 17/06 137/516.29 |
| 3,356,113 | A * | 12/1967 | Del Perugia | A01G 23/091 144/338 |
| 3,487,852 | A * | 1/1970 | Kikendall | F16K 17/10 137/514.5 |
| 3,521,817 | A * | 7/1970 | McGinnis | A01G 15/00 239/77 |
| 3,565,113 | A * | 2/1971 | Power | G05D 7/0146 137/624.14 |
| 3,589,389 | A * | 6/1971 | Nilsson | G05D 7/0193 137/403 |
| 3,628,566 | A * | 12/1971 | Carse | B67D 1/12 137/524 |
| 3,856,042 | A | 12/1974 | Fletcher et al. | |
| 4,324,069 | A * | 4/1982 | Flagg | A01G 27/001 47/62 E |
| 4,474,211 | A * | 10/1984 | Lucas | A01G 25/16 137/513.5 |
| 4,733,689 | A * | 3/1988 | Osnas | A01G 25/16 137/494 |
| 4,941,504 | A * | 7/1990 | Beauvir | F16K 1/02 137/524 |
| 4,951,416 | A * | 8/1990 | Gutridge | A01G 31/02 47/62 R |
| 5,139,044 | A * | 8/1992 | Otten | A01G 25/16 137/80 |
| 5,558,115 | A | 9/1996 | Lenz et al. | |
| 5,956,248 | A * | 9/1999 | Williams | A01G 25/16 239/69 |
| 6,691,735 | B1 * | 2/2004 | Harneit | F16K 37/0008 137/524 |
| 7,631,813 | B1 * | 12/2009 | Lichte | B05B 3/0454 239/11 |
| 7,906,703 | B2 | 3/2011 | Jeong | |
| 7,987,632 | B2 * | 8/2011 | May | A01G 7/00 47/17 |
| 9,492,834 | B1 * | 11/2016 | Bishel | B05B 17/08 |
| 9,516,822 | B2 | 12/2016 | Gonyer et al. | |
| 2002/0125338 | A1 * | 9/2002 | Collins | B05B 12/12 239/69 |
| 2004/0163308 | A1 * | 8/2004 | Uchiyama | A01G 31/042 47/1.01 R |
| 2004/0261855 | A1 * | 12/2004 | Hart | G05D 7/03 137/486 |
| 2008/0115414 | A1 * | 5/2008 | Hogan | A01G 27/003 47/66.6 |
| 2011/0023359 | A1 | 2/2011 | Raring | |
| 2011/0079654 | A1 * | 4/2011 | Bailey | A01G 25/16 239/1 |
| 2011/0162273 | A1 * | 7/2011 | Mittelmark | B01D 53/84 47/66.7 |
| 2013/0140374 | A1 * | 6/2013 | Adams | B05B 7/0408 239/8 |
| 2013/0255152 | A1 * | 10/2013 | Johnson | A01G 31/06 47/62 C |
| 2013/0283689 | A1 * | 10/2013 | Walliser | A01G 31/02 47/62 R |
| 2014/0115958 | A1 * | 5/2014 | Helene | A01G 31/06 47/17 |
| 2014/0144078 | A1 | 5/2014 | Gonyer et al. | |
| 2014/0250778 | A1 * | 9/2014 | Suntych | C12M 31/02 47/1.4 |
| 2015/0045970 | A1 * | 2/2015 | Anderson | G05D 7/0617 700/282 |
| 2015/0089866 | A1 * | 4/2015 | Abbott | A01G 7/045 47/58.1 LS |
| 2015/0173309 | A1 * | 6/2015 | Golgotiu | A01G 27/003 47/1.7 |
| 2015/0234394 | A1 * | 8/2015 | Shoham | G05D 7/0635 700/283 |
| 2015/0289463 | A1 | 10/2015 | Moriarty | |
| 2015/0373927 | A1 * | 12/2015 | Paans | A01G 27/001 47/39 |
| 2016/0044879 | A1 * | 2/2016 | Hamlin | A01G 31/02 47/62 R |
| 2016/0174477 | A1 * | 6/2016 | Li | A01G 27/005 47/48.5 |
| 2016/0179734 | A1 | 6/2016 | Shih | |
| 2016/0198652 | A1 * | 7/2016 | Yano | A01G 31/02 47/62 R |
| 2016/0242369 | A1 * | 8/2016 | Caceres | A01G 27/005 |
| 2017/0036228 | A1 * | 2/2017 | Thurow | A01C 23/007 |
| 2017/0042101 | A1 * | 2/2017 | Soltani | A01G 27/003 |
| 2017/0049061 | A1 * | 2/2017 | Khabbaz | G05D 7/0664 |
| 2017/0252714 | A1 * | 9/2017 | Bennett | A01G 25/16 |
| 2017/0347538 | A1 * | 12/2017 | Nakajima | A01G 27/00 |
| 2018/0042188 | A1 * | 2/2018 | Khabbaz | H04B 10/80 |
| 2018/0054985 | A1 * | 3/2018 | Li | A01G 7/045 |
| 2018/0149286 | A1 * | 5/2018 | Ihalainen | G05D 7/06 |
| 2018/0328513 | A1 * | 11/2018 | Emory | A01G 27/003 |
| 2018/0332788 | A1 * | 11/2018 | Leo | A01G 9/246 |
| 2018/0343806 | A1 * | 12/2018 | Leo | A01G 9/247 |
| 2020/0245573 | A1 * | 8/2020 | Xu | A01G 25/16 |

FOREIGN PATENT DOCUMENTS

| | | |
|---|---|---|
| EP | 1017950 A1 | 7/2000 |
| EP | 1599773 A1 | 11/2005 |
| JP | 2011250722 A | 12/2011 |
| KR | 101642250 B1 | 7/2016 |
| WO | 2016164652 A1 | 10/2016 |
| WO | 2017144904 A1 | 8/2017 |

\* cited by examiner

DEVICES, SYSTEMS, AND METHODS FOR PROVIDING AND USING ONE OR MORE PRESSURE VALVES IN AN ASSEMBLY LINE GROW POD

CROSS REFERENCE TO RELATED APPLICATION

This application claims the benefit of U.S. Provisional Application Ser. No. 62/519,437, filed on Jun. 14, 2017; U.S. Provisional Application Ser. No. 62/519,425, filed on Jun. 14, 2017; and U.S. Provisional Application Ser. No. 62/519,419, filed on Jun. 14, 2017, which are incorporated by reference in their respective entireties.

TECHNICAL FIELD

Embodiments described herein generally relate to systems and methods for controlling one or more components of an assembly line grow pod and, more specifically, to use of a valve control module in a modular control interface to control pressure valves in an assembly line grow pod.

BACKGROUND

In growing crops and individual plants, it may be desirable to precisely dispense water, nutrients, airflow, and/or other fluids to the plants. Some current greenhouses utilize a water line, airflow line, and/or other fluid dispensers to transfer these fluids. While these current solutions may distribute water to the plants, these solutions are not often able to accurately determine an accurate amount of fluids that are dispensed and are also unable to accurately and precisely distribute those fluids to the plants. As such, a need exists in the industry.

SUMMARY

Devices, systems, and methods for providing and using one or more pressure valves in an assembly line grow pod are disclosed. One embodiment includes an assembly line grow pod including a plurality of fluid lines fluidly coupled between a fluid source and a fluid destination within the assembly line grow pod, a plurality of pressure valves, each pressure valve of the plurality of pressure valves fluidly coupled to a fluid line of the plurality of fluid lines such that a pressure of the fluid within the fluid line is selectively controlled by the pressure valve, and a master controller communicatively coupled to the plurality of valves. The master controller is programmed to receive information relating to fluid delivery within the assembly line grow pod, determine one or more pressure valves of the plurality of pressure valves to pressurize the fluid, determine pressure valve parameters for each of the one or more pressure valves that achieve the fluid pressurization, and transmit one or more control signals to the one or more pressure valves for pressurizing the fluid within the assembly line grow pod.

In another embodiment, a pressure valve in an assembly line grow pod includes a fluid inlet fluidly coupled to an assembly line grow pod pump via a first one or more fluid lines disposed between the fluid inlet and the assembly line grow pod pump, a fluid outlet fluidly coupled to an assembly line grow pod fluid destination via a second one or more fluid lines disposed between the fluid outlet and the fluid destination, the fluid outlet further fluidly coupled to the fluid inlet port, a stopper disposed between the fluid inlet and the fluid outlet, the stopper movable between an engaged position whereby fluid flow between the fluid inlet and the fluid outlet is restricted by the stopper and a disengaged position whereby fluid flow is substantially free to move between the fluid inlet and the fluid outlet, a biasing assembly coupled to the stopper such that the biasing assembly applies a biasing force on the stopper to bias the stopper in the engaged position or in the disengaged position, an actuator coupled to the biasing assembly such that the actuator is actuable to increase or decrease the biasing force, and a body.

The body includes a processing device communicatively coupled to the actuator and to a master controller of the assembly line grow pod and a non-transitory, processor-readable storage medium communicatively coupled to the processing device. The non-transitory, processor-readable storage medium includes one or more instructions thereon that, when executed, cause the processing device to receive an instruction from the master controller, and cause the actuator to increase or decrease the biasing force in accordance with the instruction.

In yet another embodiment, a method of installing a pressure valve in an assembly line grow pod includes providing the assembly line grow pod having a fluid source and a fluid destination, disposing the pressure valve in the assembly line grow pod between the fluid source and the fluid destination and fluidly coupling the pressure valve to a first fluid line fluidly coupled to the fluid source and a second fluid line fluidly coupled to the fluid destination such that the pressure valve, when operated, selectively controls pressurization of a fluid in the first fluid line and the second fluid line from the fluid source to the fluid destination, and communicatively coupling the pressure valve to a valve control module of a master controller within the assembly line grow pod such that the pressure valve receives instructions from the valve control module for selectively controlling pressurization of the fluid.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include devices, systems, and methods for providing and operating one or more pressure valves and pumps in an assembly line grow pod. The assembly line grow pod may include a plurality of carts that follow a track and have one or more trays for holding seeds and/or plants. The pressure valves and the pumps pressurize or depressurize fluid that is then used within the assembly line grow pod. For example, the pressurized or depressurized fluid may be water, nutrients, or air that is directed to particular areas of the assembly line grow pod to ensure optimum growth of the seeds and/or plants as the trays traverse the track. The pressure valves and the pumps are controlled by a master controller.

Specific control of the pressure valves may be performed by one or more hot-swappable modules (e.g., a hot swappable valve control module) that are inserted in a modular control interface of the master controller. In order for the various modules to be hot swappable, the devices, systems and methods described herein are utilized to ensure uninterrupted functioning of the assembly line grow pod when particular modules are removed from the modular control interface of the master controller. As such, the devices, systems, and methods described herein provide functionality to control at least a portion of the pressure valves and/or the pumps in the assembly line grow pod to ensure that the assembly line grow pod continues to function as particular modules are swapped out. The devices, systems, and methods for providing and using pressure valves in an assembly line grow pod, as well as an assembly line grow pod incorporating the same will be described in more detail below.

Figure 1A:
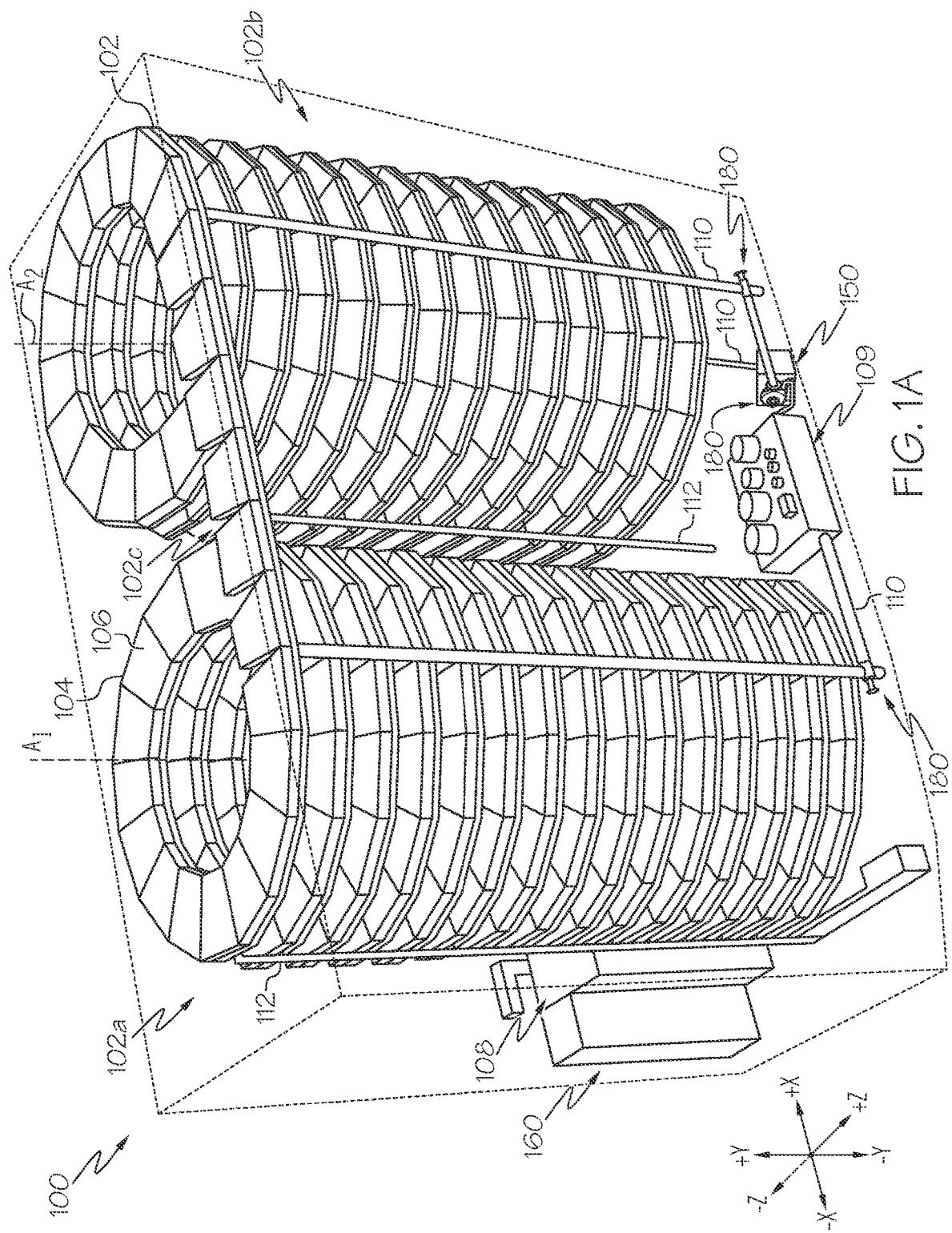
FIG. 1A schematically depicts a front perspective view of an illustrative assembly line grow pod having a master controller according to one or more embodiments shown and described herein.
Figure 1B:
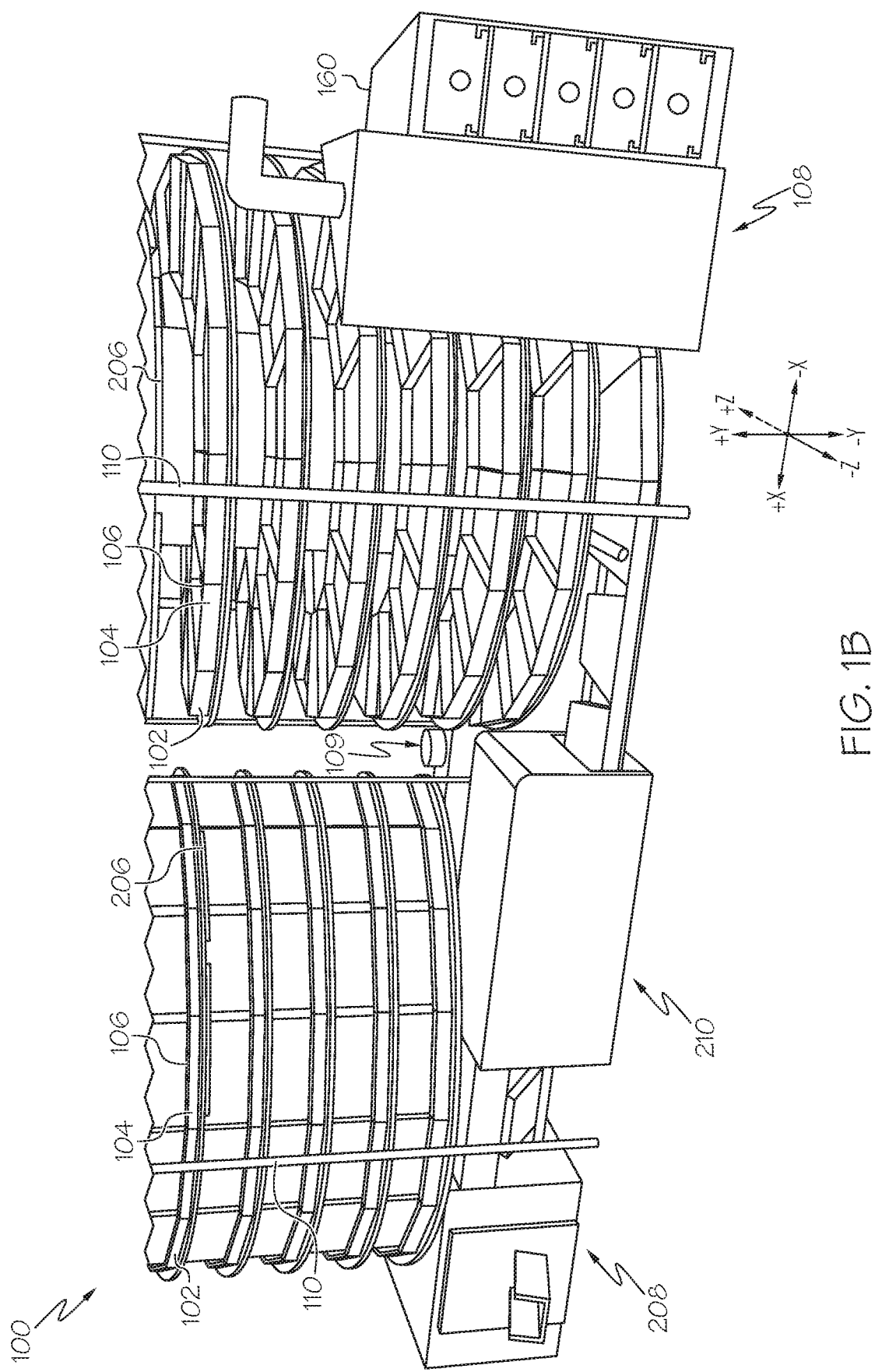
FIG. 1B schematically depicts a rear perspective view of a portion of an illustrative assembly line grow pod having a master controller according to one or more embodiments shown and described herein.

An illustrative industrial grow pod that allows for the continuous, uninterrupted growing of crops is depicted herein. Particularly, FIG. 1A depicts a front perspective view of an illustrative assembly line grow pod 100 having a master controller according to one or more embodiments shown and described herein. In addition, FIG. 1B depicts a rear perspective view of a portion of the assembly line grow pod 100. As illustrated in FIGS. 1A and 1B, the assembly line grow pod 100 may include a track 102 that holds one or more carts 104. Referring particularly to FIG. 1A, the track 102 may include at least an ascending portion 102a, a descending portion 102b, and a connection portion 102c. The track 102 may wrap around (e.g., in a counterclockwise direction, as shown in FIG. 1A) a first axis $A_1$ such that the carts 104 ascend upward in a vertical direction (e.g., in the +y direction of the coordinate axes of FIG. 1A). The connection portion 102c may be relatively level (although this is not a requirement) and is utilized to transfer carts 104 to the descending portion 102b. The descending portion 102b may be wrapped around a second axis $A_2$ (e.g., in a counterclockwise direction, as shown in FIG. 1A) that is substantially parallel to the first axis $A_1$, such that the carts 104 may be returned closer to a ground level.

It should be understood that while the embodiment of FIGS. 1A and 1B depict an assembly line grow pod 100 that wraps around a plurality of axes $A_1$, $A_2$, this is merely one example. Any configuration of assembly line or stationary grow pod may be utilized for performing the functionality described herein.

Referring to FIG. 1A, supported on each one of the carts 104 is a tray 106. The tray 106 may generally contain one or more components for holding seeds as the seeds germinate and grow into plants as the cart 104 traverses the ascending portion 102a, the descending portion 102b, and the connection portion 102c of the track 102 of the assembly line grow pod 100. The seeds may be planted, allowed to grow, and then may be harvested by various components of the assembly line grow pod 100, as described in greater detail herein. In addition, the seeds (and thereafter the shoots and plants) within the trays 106 may be monitored, provided with water, nutrients, environmental conditions, light, and/or the like to facilitate growing.

Also depicted in FIGS. 1A and 1B is a master controller 160. The master controller 160 may include, among other things, control hardware for controlling various components of the assembly line grow pod 100, as described in greater detail herein. The master controller 160 may be arranged as a modular control interface that receives a plurality of hot-swappable control modules, as described in greater detail herein. One module in the master controller 160, which may be fixed or hot-swappable, may be the valve control module.

Coupled to the master controller 160 is a seeder component 108. The seeder component 108 may be configured to place seeds in the trays 106 supported on the one or more carts 104 as the carts 104 pass the seeder component 108 in the assembly line. Depending on the particular embodiment, each cart 104 may include a single section tray 106 for receiving a plurality of seeds. Some embodiments may include a multiple section tray 106 for receiving individual seeds in each section (or cell). In the embodiments with a single section tray 106, the seeder component 108 may detect the presence of the respective cart 104 and may begin laying seed across an area of the single section tray 106. The seed may be laid out according to a desired depth of seed, a desired number of seeds, a desired surface area of seeds, and/or according to other criteria. In some embodiments, the seeds may be pre-treated with nutrients and/or anti-buoyancy agents (such as water) as these embodiments may not utilize soil to grow the seeds and thus might need to be submerged.

In the embodiments where a multiple section tray 106 is utilized with one or more of the carts 104, the seeder component 108 may be configured to individually insert seeds into one or more of the sections of the tray 106. Again, the seeds may be distributed on the tray 106 (or into individual cells) according to a desired number of seeds, a desired area the seeds should cover, a desired depth of seeds, etc.

Referring to FIG. 1A, the assembly line grow pod 100 may also include a watering component 109 coupled to one or more water lines 110 via one or more pumps 150 and/or one or more pressure valves 180 in some embodiments. While only a single pump 150 is depicted in FIG. 1A, it should be understood that the assembly line grow pod 100 may incorporate a plurality of pumps 150 in some embodiments. Likewise, while a plurality of pressure valves 180 are depicted in FIG. 1A, it should be understood that the assembly line grow pod 100 may incorporate a single pressure valve 180 in some embodiments. The watering component 109, the one or more pumps 150, the one or more pressure valves 180, and the one or more water lines 110 may distribute water and/or nutrients to one or more trays 106 at particular areas of the assembly line grow pod 100.

For example, the one or more water lines 110 may extend between the watering component 109 and one or more watering stations arranged at particular locations within the assembly line grow pod 100 such that the pumps 150 connected in line with the water lines 110 pump water and/or nutrients to the one or more watering stations and the one or more pressure valves 180 selectively block a flow of the water and/or nutrients to the one or more watering stations to increase the pressure of the water and/or nutrients until the pressure of the water and/or nutrients reaches a particular threshold pressure, as described herein. As a cart 104 passes a watering station, a particular amount of the pressurized water and/or nutrients may be provided to the tray 106 supported by the cart 104.

For example, seeds may be sprayed at a watering station to reduce buoyancy and then flooded. Additionally, water usage and consumption may be monitored at a watering station and data may be generated that corresponds to such water usage and consumption. As such, when the cart 104 reaches a subsequent watering station along the track 102 in the assembly line grow pod 100, the data may be utilized to determine an amount of water and/or a pressure of water to be supplied to the tray 106 at that time.

In addition, the watering component 109 is communicatively coupled to the master controller 160 (particularly a valve control module therein, as described in greater detail herein) such that the master controller 160 provides control signals to the watering component 109 and/or receives status signals from the watering component 109. As a result of this providing and receiving of signals, the master controller 160 can effectively direct the watering component 109 to provide fluid via one or more water lines 110 fluidly coupled to the watering component 109, particularly fluid to be pressurized or depressurized by the pressure valve 180 and/or the pump 150, as described in greater detail herein.

Also depicted in FIG. 1A are airflow lines 112, which may also be fluidly connected to one or more air pumps and/or one or more air valves (not shown in FIG. 1A). Specifically, the one or more air pumps may be pumps that are similar to pumps 150, but are coupled to the airflow lines 112 to deliver air to one or more portions of the assembly line grow pod 100. In addition, the one or more air valves may be valves that are similar to the pressure valves 180, but are coupled to the airflow lines 112 to pressurize or depressurize the air within the airflow lines 112.

The air may be pressurized/depressurized and delivered, for example, to control a temperature of the assembly line grow pod 100 or an area thereof, a pressure of the air in the assembly line grow pod 100 or an area thereof, control a concentration of carbon dioxide ($CO_2$) in the air of the assembly line grow pod 100 or an area thereof, control a concentration of oxygen ($O_2$) in the air of the assembly line grow pod 100 or an area thereof, control a concentration of nitrogen ($N_2$) in the air of the assembly line grow pod 100 or an area thereof, and/or the like. Accordingly, the airflow lines 112 may distribute the airflow at particular areas in the assembly line grow pod 100 to facilitate control.

As such, the airflow lines 112 may be fluidly coupled to a pump and/or a pressure valve and may further be fluidly coupled between an air source and a target air delivery area. In addition, sensors may sense characteristics (e.g., a concentration, a pressure, a temperature, flow velocity, and/or the like) and may generate data and/or signals corresponding to the sensed characteristics, which may be used for further control.

Referring to FIG. 1B, additional components of the assembly line grow pod 100 are illustrated, including (but not limited to) one or more lighting devices 206, a harvester component 208, and a sanitizer component 210. As described above, the seeder component 108 may be configured to seed the trays 106 of the carts 104. Still referring to FIG. 1A, the lighting devices 206 may provide light waves that may facilitate plant growth at various locations throughout the assembly line grow pod 100 as the carts 104 traverse the track 102. Depending on the particular embodiment, the lighting devices 206 may be stationary and/or movable. As an example, some embodiments may alter the position of the lighting devices 206, based on the plant type, stage of development, recipe, and/or other factors.

Additionally, as the plants are lighted, watered, and provided nutrients, the carts 104 traverse the track 102 of the assembly line grow pod 100. Additionally, the assembly line grow pod 100 may detect a growth and/or fruit output of a plant and may determine when harvesting is warranted. If harvesting is warranted prior to the cart 104 reaching the harvester component 208, modifications to a recipe may be made for that particular cart 104 until the cart 104 reaches the harvester component 208. Conversely, if a cart 104 reaches the harvester component 208 and it has been determined that the plants in the cart 104 are not ready for harvesting, the assembly line grow pod 100 may commission the cart 104 for another lap. This additional lap may include a different dosing of light, water, nutrients, etc. and the speed of the cart 104 could change, based on the development of the plants on the cart 104. If it is determined that the plants on a cart 104 are ready for harvesting, the harvester component 208 may harvest the plants from the trays 106.

Referring to FIG. 1B, the harvester component 208 may cut the plants at a particular height for harvesting in some embodiments. In some embodiments, the tray 106 may be overturned to remove the plants from the tray 106 and into a processing container for chopping, mashing, juicing, and/or the like. Because many embodiments of the assembly line grow pod 100 do not use soil, minimal (or no) washing of the plants may be necessary prior to processing.

Similarly, some embodiments may be configured to automatically separate fruit from the plant, such as via shaking, combing, etc. If the remaining plant material may be reused to grow additional fruit, the cart 104 may keep the remaining plant and return to the growing portion of the assembly line. If the plant material is not to be reused to grow additional fruit, it may be discarded or processed, as appropriate.

Once the cart 104 and tray 106 are clear of plant material, the sanitizer component 210 may remove any particulate matter, plant material, and/or the like that may remain on the cart 104. As such, the sanitizer component 210 may implement any of a plurality of different washing mechanisms, such as high pressure water, high temperature water, and/or other solutions for cleaning the cart 104 and/or the tray 106. As such, the sanitizer component 210 may be fluidly coupled to one or more of the water lines 110 to receive water that is pumped via the one or more pumps 150 and directed and/or pressurized via the one or more pressure valves 180 (FIG. 1A) through the water lines 110.

Still referring to FIG. 1B, the tray 106 may be overturned to output the plant for processing and the tray 106 may remain in this position in some embodiments. As such, the sanitizer component 210 may receive the tray 106 in this position, which may wash the cart 104 and/or the tray 106 and return the tray 106 back to the growing position. Once the cart 104 and/or tray 106 are cleaned, the tray 106 may again pass the seeder component 108, which may determine that the tray 106 requires seeding and may begin the process placing seeds in the tray 106, as described herein.

It should be understood that the assembly line grow pod 100 may include additional components not specifically described herein, and the present disclosure is not limited solely to the components described herein. Illustrative additional components may include, but are not limited to, other watering components, other lighting components, other airflow components, growth monitoring components, other harvesting components, other washing and/or sanitizing components, and/or the like.

Control of the various components described hereinabove, as well as components of the assembly line grow pod 100 not specifically described herein, may be completed by a plurality of control modules within the master controller 160. Each control module within the master controller 160 may be particularly configured to control a single component, a plurality of components, portions of one or more components, and/or the like. For example, a valve control module may control operation of one or more pressure valves that pressurize and/or depressurize fluids, including (but not limited to) water, nutrients, ambient air, and/or the like, such as the one or more pressure valves 180 described herein.

In some embodiments, control of various components of the assembly line grow pod 100 may be managed by a plurality of control modules such that if a particular control module is removed from the master controller 160 (e.g., a valve control module), the remaining control modules within the master controller 160 can still control various functions of the assembly line grow pod 100 (e.g., fluid control functions of the one or more pressure valves 180) so as to avoid an instance where the entire assembly line grow pod 100 (or a portion of the assembly line grow pod 100, such as the pressure valves 180) has to be shut down while a control module is removed, replaced, repaired, or the like. To ensure that the assembly line grow pod 100 continues to run even as a particular control module is removed from the master controller 160, the master controller 160 may include a control module that acts as an intermediary module, sending and receiving signals from the various components of the assembly line grow pod 100 and relaying such signals between the appropriate control module(s) within the master controller 160. In some embodiments, the control module may include computer hardware and software components that utilize scripting language to translate recipes and other instructions that are received into binary signals that can be transmitted to the other control modules included within the master controller 160 (e.g., a pump control module).

For example, if a determination is made that a particular tray 106 is to be watered by a watering device (e.g., a fluid distribution manifold, watering nozzle, or the like) and that the tray 106 is passing in a particular period of time, the control module may determine what components (e.g., pressure valves) are needed, prepare binary signals, and relay the binary signals to the various other control modules that control watering at the time at which watering is necessary (e.g., a valve control module). Other particular details regarding the functionality of the various control modules are discussed herein.

While the present disclosure generally relates to a hot swappable or removably insertable control module and/or a hot swappable or removably insertable valve control module, the present disclosure is not restricted to such. In some embodiments, the control module and/or the valve control module may each individually be fixed within the master controller 160 such that they are not removably insertable or hot swappable like the various other modules. As such, the control module and/or the valve control module may always be available to function within the master controller 160 as described herein.

Figure 2:
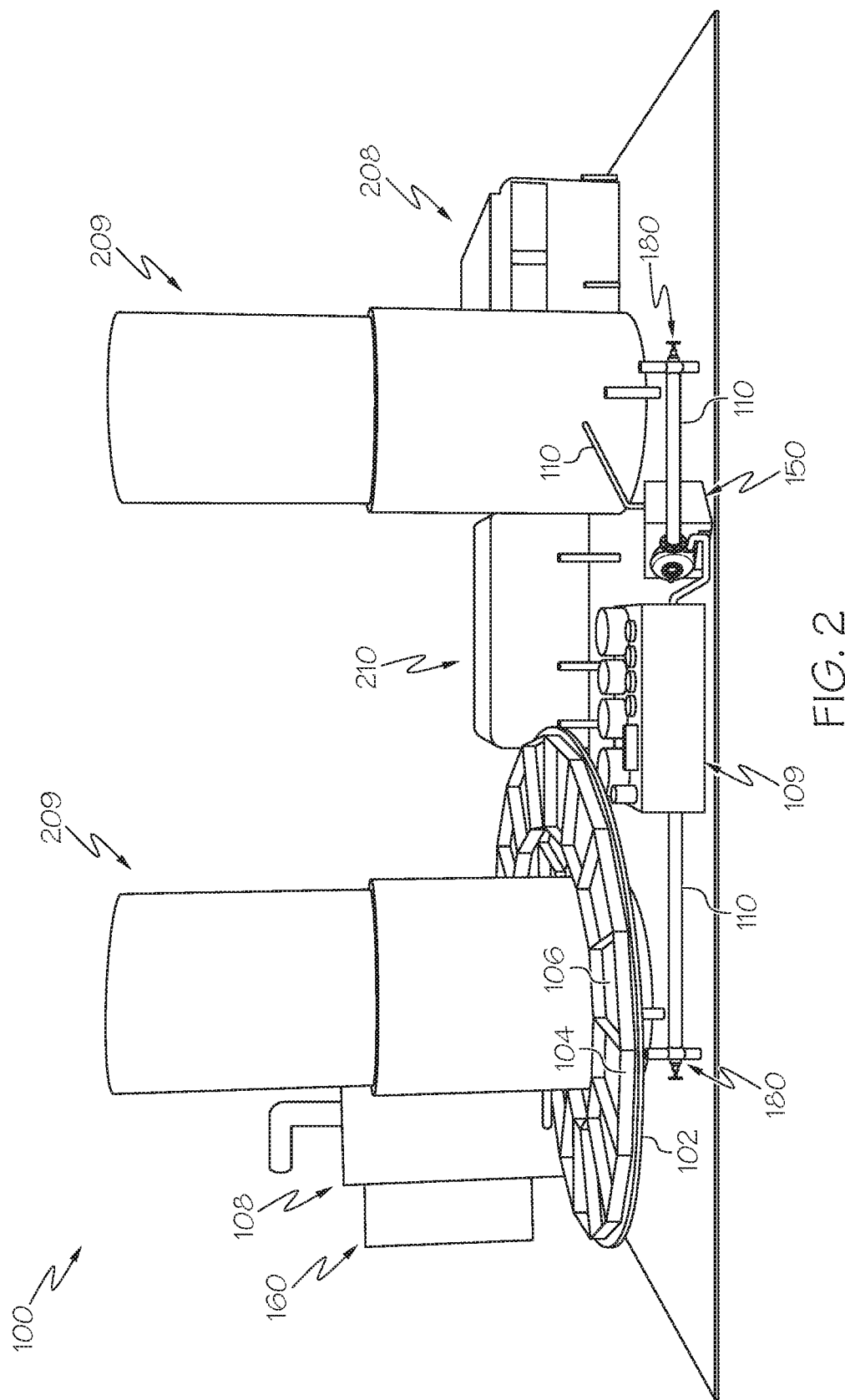
FIG. 2 schematically depicts a front perspective view of an illustrative assembly line grow pod having a master controller with portions of a track removed for purposes of illustrating additional components of the assembly line grow pod according to one or more embodiments shown and described herein.

In addition to the various components described hereinabove with respect to FIGS. 1A and 1B, the assembly line grow pod 100 may further include additional components that are specifically related to storing fluid, moving fluid, distributing fluid, pressurizing fluid, combining fluids, and/or the like. For example, FIG. 2 schematically depicts a front perspective view of an illustrative assembly line grow pod having a master controller 160 with portions of a track 102 removed for purposes of illustrating additional components of the assembly line grow pod 100. More specifically, FIG. 2 depicts a plurality of fluid holding tanks 209.

The fluid holding tanks 209 may generally be storage tanks that are adapted to hold various fluids, including water, water and nutrient combinations, nutrients, gasses (including oxygen, carbon dioxide, nitrogen, and/or the like). In some embodiments, the fluid holding tanks 209 may be fluidly coupled to one or more of the water lines 110, the one or more pumps 150, the one or more pressure valves 180, the watering component 109, and/or the one or more airflow lines 112 (FIG. 1A) to supply the fluid contained therein to various portions of the assembly line grow pod via the one or more water lines 110 and/or the one or more airflow lines 112 (FIG. 1A) when other components control fluid flow (e.g., the one or more pumps 150 and/or the watering component 109) and pressurization/depressurization of fluid (e.g., the one or more pumps 150 and/or the one or more pressure valves 180). Still referring to FIG. 2, the fluid holding tanks 209 are otherwise not limited by the present disclosure, and may have any other features or characteristics without departing from the scope of the present disclosure.

As described above, the master controller 160 may direct the watering component 109 to provide various fluids to the trays 106 of the carts 104 and/or provide airflow to the assembly line grow pod 100 or portions thereof. More specifically, the watering component 109 may contain or be fluidly coupled to one or more pumps 150 that pump the various fluids to particular areas within the assembly line grow pod from the one or more fluid holding tanks 209 upon receiving instructions from the master controller 160 and the one or more pressure valves 180 may assist with pressurization or depressurization of the fluid within the assembly line grow pod 100 as needed.

For example, the master controller 160 may determine a particular location that is in need of fluid, the current pressure of the fluid, a particular pressure of fluid that is to be supplied at the particular location, and one or more components to supply and/or pressurize the fluid (e.g., the fluid holding tanks 209, the watering component 109, one or more pumps 150, and/or one or more pressure valves 180). The master controller 160 may then provide instructions to the various components for directing and/or pressurizing/depressurizing fluid accordingly (e.g., by providing instructions to the pressure valves 180 to increase or decrease a release pressure, providing instructions to a pump 150 to pump the fluid, and/or the like, as described herein).

Figure 3A:
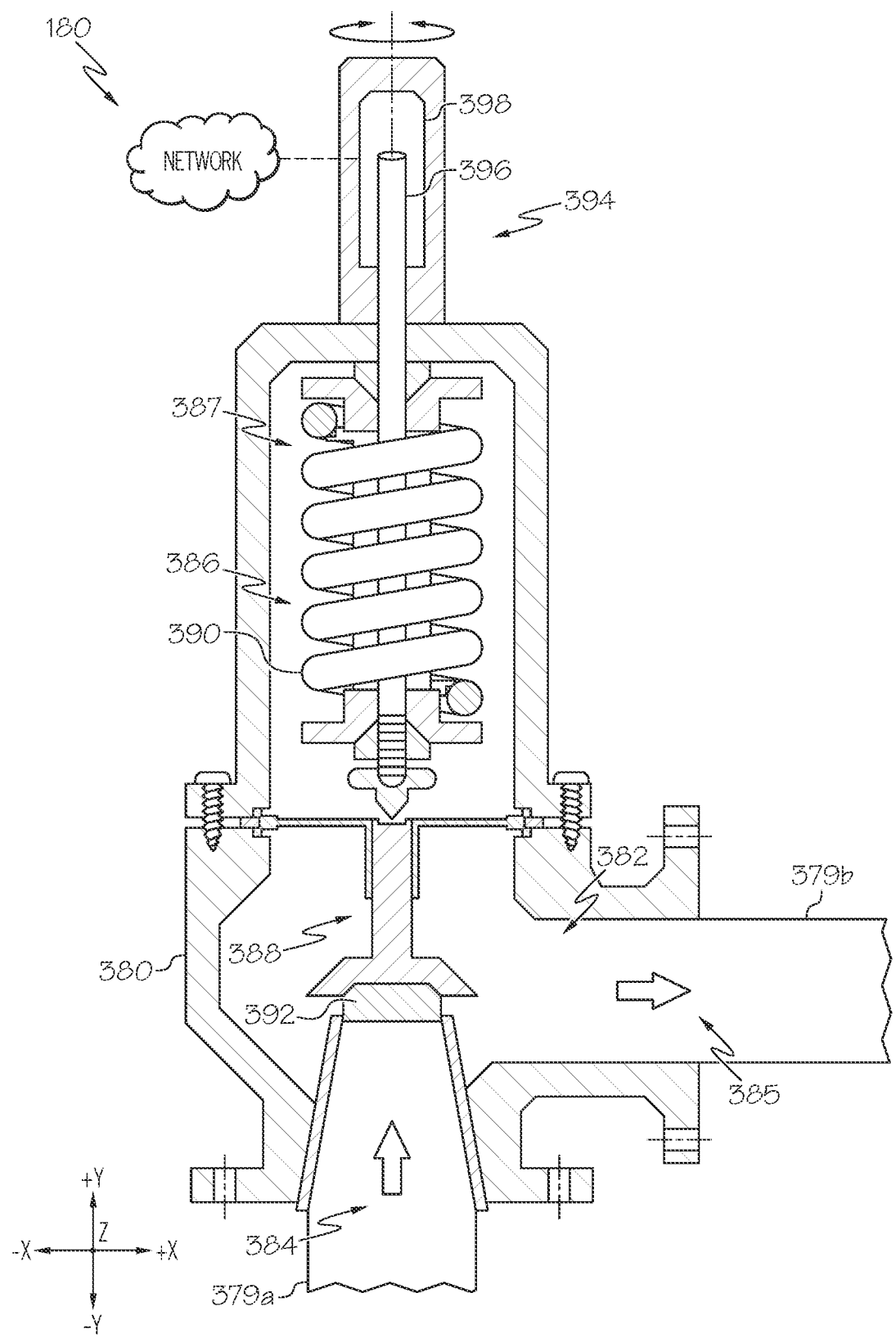
FIG. 3A schematically depicts a cutaway side view of an illustrative pressure valve according to one or more embodiments shown and described herein.

FIG. 3A schematically depicts a cutaway side view of the pressure valve 180. As shown in FIG. 3A, the pressure valve 180 generally includes a body 380 that defines a cavity 382 therein. The cavity 382 may be fluidly coupled via a fluid inlet 384 and via a fluid outlet 385 to one or more fluid lines 379. For example, the fluid inlet 384 may be fluidly coupled to a first (inlet) fluid line 379*a* and the fluid outlet 385 may be coupled to a second (outlet) fluid line 379*b*. It should be understood that the fluid lines 379 may be the water lines 110 and/or the airflow lines 112 (FIG. 1A) as described herein. It should be understood that the fluid coupling of the cavity 382 to the fluid lines 379 via the fluid inlet 384 and the fluid outlet 385 allows fluid to enter the cavity 382 via the fluid inlet 384 and exit the cavity 382 via the fluid outlet.

Also depicted in FIG. 3A are a plurality of components of the pressure valve 180 within the cavity 382. For example, a plunger 386 may be disposed within the cavity 382 such that a proximal end 387 of the plunger 386 is disposed near an upper portion of the cavity (i.e., an area located towards the +y direction of the coordinate axes of FIG. 3A) and a distal end 388 of the plunger 386 is disposed near the fluid inlet 384. The distal end 388 of the plunger 386 may include a stopper 392 integrated therein or coupled thereto. The stopper 392 may be shaped, sized, and configured to cover the fluid inlet 384 and/or the fluid outlet 385 such that the stopper 392 blocks fluid flow through the fluid inlet 384 and/or fluid flow through the fluid outlet 385 when the stopper 392 is placed over or within the fluid inlet 384 and/or the fluid outlet 385.

The stopper 392 may be movable via the plunger 386 from an engaged position whereby fluid flow into the cavity 382 and/or fluid flow out of the cavity 382 is blocked to a disengaged position whereby fluid flow in and out of the cavity 382 is unrestricted. In the engaged position, the stopper 392 may be positioned over or in the fluid inlet 384 and/or the fluid outlet 385 to block fluid flow. In the disengaged position, the stopper 392 may be positioned away from the fluid inlet 384 and the fluid outlet 385 so as to allow fluid flow.

In some embodiments, the plunger 386 may be coupled to a biasing assembly 390 that biases the plunger 386 with a biasing force in a particular direction. For example, in the embodiment shown in FIG. 3A, the biasing assembly 390 may apply a biasing force on the plunger 386 in the distal direction (e.g., in the −y direction of the coordinate axes of FIG. 3A). Consequently, the biasing assembly 390 biases the stopper 392 in the engaged position. It should be understood that the biasing assembly 390 may bias the plunger 386 in other directions in some embodiments.

The biasing assembly 390 is not limited by the present disclosure, and may generally be any device or component that biases the plunger 386 as described herein. For example, the biasing assembly 390 is a helical compression spring that is disposed around a circumference of the plunger 386 to provide a biasing force on the plunger 386 as described herein. In some embodiments, a tension of the biasing assembly 390 may be adjusted to increase or decrease the biasing force applied by the biasing assembly 390. For example, the biasing assembly 390 may be coupled to an adjusting screw 396 or the like that twists to increase or decrease the tension of the biasing assembly 390, thereby increasing or decreasing the biasing force applied by the biasing assembly 390. The adjusting screw 396 may be located within a cap portion 394 of the pressure valve 180. In some embodiments, the adjusting screw 396 may be coupled to an actuator 398 or the like that receives signals and as a result, twists the adjusting screw 396 to increase or decrease the tension of the biasing assembly 390.

Adjustment of the adjusting screw 396 by the actuator 398 to increase or decrease the tension of the biasing assembly 390 may generally be completed to ensure that only a particular pressure of the fluid in the first fluid line 379*a* is allowed to pass through the pressure valve 180 into the second fluid line 379*b*, thereby ensuring a precise fluid pressure of fluid that is to be delivered to a particular location within the assembly line grow pod 100 (FIG. 1A). For example, if the pressure valve 180 is used to increase a pressure of fluid, the adjusting screw 396 may be adjusted by the actuator 398 to increase or decrease the tension of the biasing assembly 390 such that the fluid of the pressure in the first fluid line 379*a* has to build up to a particular pressure (e.g., by pumping additional fluid into the first fluid line 379*a* and blocking movement of the fluid via the stopper 392) before it overcomes the biasing force to push the stopper 392 out of the fluid path between the first fluid line 379*a* and the second fluid line 379*b* (e.g., by pushing the stopper 392 in the +y direction of the coordinate axes of FIG. 3A). As a result, the pressure that exits the pressure valve 180 via the second fluid line 379*b* is at a specific pressure that is needed for fluid delivery.

In the embodiment depicted in FIG. 3A, the pressure valve 180 and/or the components thereof are particularly arranged and configured to increase a pressure of a fluid within the first fluid line 379*a* to a specific pressure, as described above. However, the present disclosure is not limited to such. That is, the pressure valve 180 and/or the components thereof may be arranged and configured to decrease a pressure of a fluid within the first fluid line 379*a* to a specific pressure in some embodiments. In such a configuration, the stopper 392 may act as a poppet that is biased by the biasing assembly 390 in an open (disengaged) position such that fluid flow from the first fluid line 379*a* to the second fluid line 379*b* via the fluid inlet 384 and the fluid outlet 385 is unrestricted (e.g., biased in the −y direction of the coordinate axes of FIG. 3A such that the stopper 392 is pushed below tapered walls of the fluid inlet 384).

As the pressure of the fluid within the first fluid line 379 increases, the fluid pressure overcomes the biasing force, thereby pressing the stopper 392 (e.g., the poppet) upwards (e.g., in the +y direction of the coordinate axes of FIG. 3A) to block the fluid flow from the first fluid line 379*a* to the second fluid line 379*b* (e.g., by pressing the stopper 392 against the tapered walls of the fluid inlet 384). As the pressure decreases within the first fluid line 379*a* to reach a specific pressure, the biasing assembly 390 may again push the stopper downwards (e.g., in the −y direction of the coordinate axes of FIG. 3A) to again allow the fluid (which is now at a particular pressure) to flow through.

It should be understood that the pressure valve 180 depicted in FIG. 3A is merely an illustrative example of a pressure valve. Other pressure valves that operate in different manners to selectively restrict fluid flow, increase fluid pressure, decrease fluid pressure, and/or the like are contemplated and included within the scope of the present disclosure.

Figure 3B:
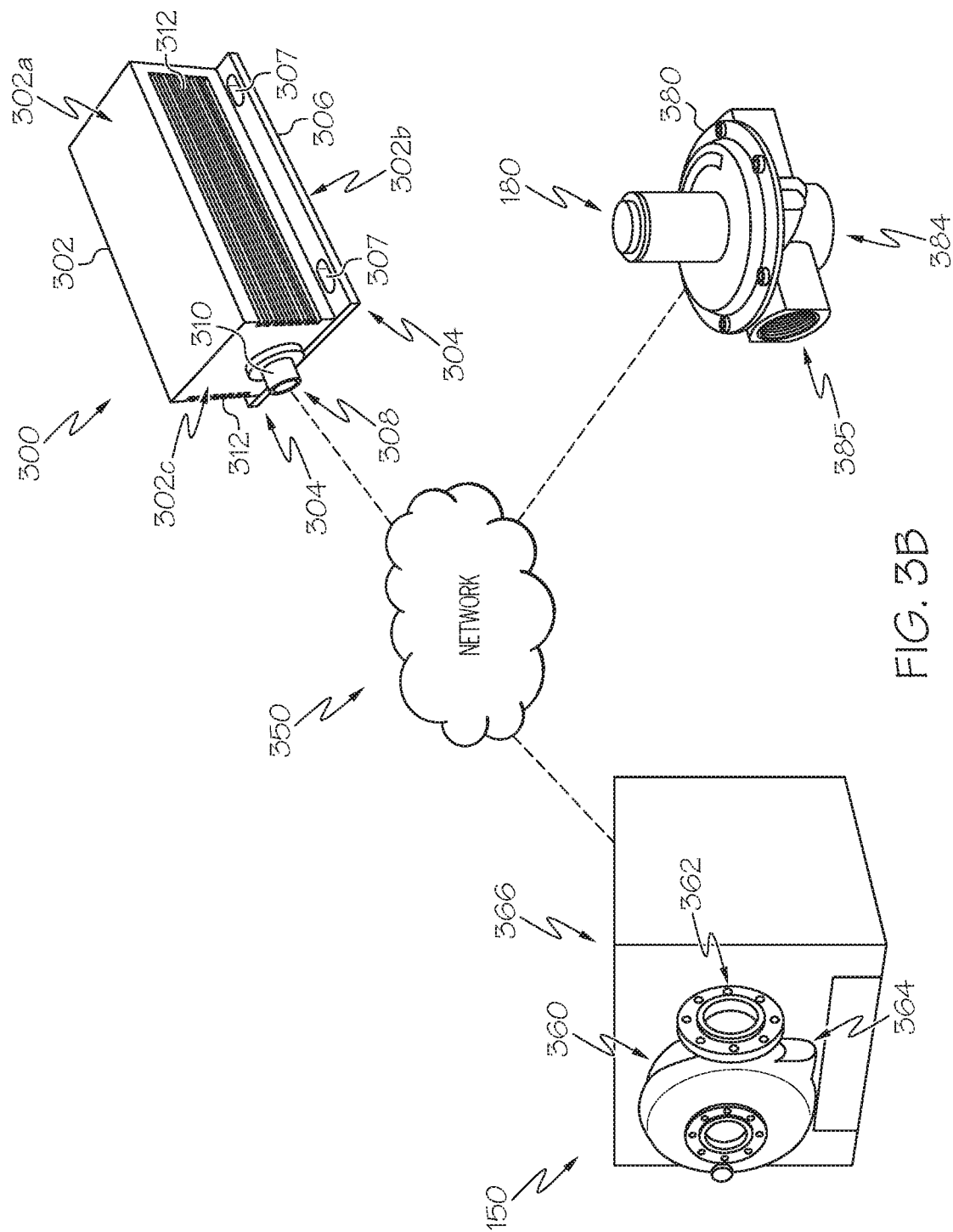
FIG. 3B schematically depicts a valve control module communicatively coupled to a pump and a pressure valve in an assembly line grow pod network according to one or more embodiments shown and described herein.

FIG. 3B schematically depicts a valve control module 300 communicatively coupled to a pump 150 and/or a pressure valve 180 in an assembly line grow pod communications network 350 according to various embodiments. In some embodiments, the valve control module 300 may be communicatively coupled to the pump 150 and the pressure valve 180 via the communications network 350. The communications network 350 may include the internet or other wide area network, a local network, such as a local area network, or a near field network, such as Bluetooth or a near field communication (NFC) network. In some embodiments, the communications network 350 may be a specific valve and pump network whereby each of the pumps 150 and the pressure valves 180 in the assembly line grow pod 100 (FIG. 1A) is communicatively coupled to the valve control module 300. In other embodiments, the communications network 350 may be a specific valve network whereby each of the pressure valves 180 in the assembly line grow pod 100 (FIG. 1A) is communicatively coupled to the valve control module 300. In other embodiments, instead of being connected via the communications network 350, the valve control module 300 may be directly connected to the pump 150 and/or the pressure valves 180 for the purposes of communications.

Still referring to FIG. 3B, communications between the valve control module 300 and the pump 150 and/or the pressure valve 180 may be such that the valve control module 300 provides transmissions, such as data and signals, to the pump 150 and/or the pressure valve 180 for the purposes of directing operation of the pump 150 and/or the pressure valve 180. That is, the valve control module 300 may direct the pump 150 when to pump fluid, when to stop pumping fluid, how much fluid to pump, a rate at which the fluid should be pumped, the direction of fluid pumping, and/or the like. In addition, the valve control module 300 may direct the pressure valve 180 to adjust a tension of the biasing assembly 390 (FIG. 3A) to ensure a specific pressure is built up, and/or the like. Still referring to FIG. 3B, communications between the valve control module 300 and the pump 150 and/or the pressure valve 180 may be such that the valve control module 300 receives feedback from the pump 150 and/or the pressure valve 180 in other embodiments. That is, the valve control module 300 may receive data, signals, or the like that are indicative of pump and/or pressure valve 180 operation, including whether the pump 150 and/or the pressure valve 180 are operating correctly or incorrectly, start/stop logs, capacity and rate logs, opening/closing logs, tension settings, whether any errors have been detected, a location of the pump 150 and/or the pressure valve 180 within the assembly line grow pod (FIG. 1A) and/or the like. Still referring to FIG. 3B, the valve control module 300 may utilize this feedback to make adjustments to the pump 150 and/or the pressure valve 180, to direct other pumps 150 to pump and/or other pressure valves 180 to adjust a tension of the biasing assembly 390 (FIG. 3A), to communicate with other portions of the master controller 160 (FIG. 1A), and/or the like to ensure that the assembly line grow pod 100 (FIG. 1A) continues to run in an appropriate manner.

Still referring to FIG. 3B, the valve control module 300 may generally include a housing 302 supported on a base 306. The base 306 may support the housing 302 within the master controller 160 (FIG. 1B), as described in greater detail herein. Still referring to FIG. 3B, the housing 302 of the valve control module 300 may include a plurality of walls, such as, for example, a first side wall 302a, a second side wall 302b, and a third side wall 302c. The first side wall 302a, the second side wall 302b, and the third side wall 302c may extend from the base 306 and at least partially define a cavity that contains various internal components of the valve control module 300, as described in greater detail herein.

In various embodiments, the valve control module 300 may further include an I/O port 308 within the housing 302. The I/O port 308 may have a body 310 that extends from the housing 302 (e.g., from the third side wall 302c of the housing 302) and allows the various internal hardware components of the valve control module 300 to be coupled to external components, such as, for example, various components of the assembly line grow pod 100 (FIG. 1A), including (but not limited to) the master controller 160 (FIG. 1B). Still referring to FIG. 3B, the body 310 of the I/O port 308 may be shaped, sized, and configured to couple to a corresponding bay I/O port to facilitate communicative coupling between the valve control module 300 and the various components of the assembly line grow pod 100 (FIG. 1A), including (but not limited to) the master controller 160, the pump 150, and the pressure valve 180. For example, the body 310 of the I/O port 308 may have a shape that corresponds to a receptacle in a bay I/O port such that the body 310 can be inserted within a bay I/O port, as described in greater detail herein. Still referring to FIG. 3B, the I/O port 308 may be a communications port or the like that contains circuitry and/or other mechanical coupling components that allow various hardware components within the valve control module 300 to communicate with one or more other control modules and/or one or more of the various components of the assembly line grow pod 100 (FIG. 1A) via the master controller 160 (FIG. 1B) (e.g., the pump 150 and/or the pressure valve 180), as described in greater detail herein.

In various embodiments, the valve control module 300 may further include one or more features for securing the valve control module 300 to another object, such as, for example, a bay in the master controller 160 (FIG. 1B). For example, the base 306 of the valve control module 300 may extend a distance beyond the various side walls of the housing 302 (e.g., extend beyond the first side wall 302a and the second side wall 302b in the +x/−x directions of the coordinate axes of FIG. 3B) to define a plurality of flanges 304 that are insertable into a support mechanism or the like, as described in greater detail herein. The flanges 304 may include one or more structures for securing the base 306 of the valve control module 300.

For example, the flanges 304 may include a plurality of apertures 307 therethrough, as shown in FIG. 3B. The plurality of apertures 307 may receive a retention device, such as a screw, a bolt, a clip, and/or the like to secure the base 306, as described in greater detail herein. It should be understood that the apertures 307 are merely an illustrative example of one type of feature that may be used to secure the base 306, and the present disclosure is not limited to such. That is, other securing features are also contemplated and included within the scope of the present disclosure. It should also be understood that the apertures 307 are optional components, and the base 306 may be secured by other means or may not be secured at all in some embodiments.

The various internal components of the valve control module 300 may produce heat as a byproduct of operation. As such, the valve control module 300 may incorporate one or more cooling features therein to dissipate the heat generated by the internal components thereof in some embodiments. For example, the housing 302 of the valve control module 300 may include one or more heat dissipating fins 312 disposed thereon in some embodiments. That is, the first side wall 302a and/or the second side wall 302b may each include the heat dissipating fins 312. Other features for dissipating heat may also be used in addition to (or as an alternative to) the heat dissipating fins 312.

The various internal components of the valve control module 300 may generally provide the functionality of the valve control module 300, as described herein. That is, the internal components of the valve control module 300 may be a computing environment.

Still referring to FIG. 3B, the pump 150 may generally include a housing 366 holding a plurality of hardware components that allow the pump 150 to communicate with the valve control module 300. In addition, the pump 150 includes a pumping mechanism 360 that functions to pump fluid from a fluid inlet port 364 to a fluid outlet port 362. More specifically, the fluid inlet port 364 is fluidly coupled to the fluid outlet port 362 and the pumping mechanism 360 is fluidly coupled between the fluid inlet port 364 and the fluid outlet port 362 such that fluid is drawn into the pump 150 via fluid inlet port 364 and moves out of the pump 150 via the fluid outlet port 362 by the pumping mechanism 360.

The pumping mechanism 360 may generally be any mechanism that is used for the purposes of pumping fluid, including a particularly measured amount of fluid. For example, the pumping mechanism 360 may be a positive displacement pump, a centrifugal pump, or a roto-dynamic pump.

Control of the pumping mechanism 360 may be completed by various hardware components within the housing 366, such as, for example, processing devices, non-transitory, processor-readable storage media, communications hardware, and/or the like. The various hardware components may transmit a start signal, a stop signal, a signal to change pump speed, a capacity, a fluid pressure, and/or the like to the pumping mechanism 360. As such, the pumping mechanism 360 may be communicatively coupled to one or more of the various hardware components within the housing 366 for the purposes of transmitting and receiving signals.

Referring to FIGS. 1A and 3B, both the fluid inlet port 364 and the fluid outlet port 362 may be fluidly coupled to one or more of the water lines 110 or one or more of the airflow lines 112 of the assembly line grow pod 100. As such, fluid from the water lines 110 or airflow lines 112 coupled to the fluid inlet port 364 may be received by the pumping mechanism 360 and ejected out of the water lines 110 or airflow lines 112 coupled to the fluid outlet port 362. As such, the fluid inlet port 364 may generally be fluidly coupled (e.g., via the water lines 110 or the airflow lines 112) to a fluid source (e.g., the fluid holding tanks 209 depicted in FIG. 1B). The fluid source may also be referred to as an "assembly line grow pod fluid source" herein, as the fluid source is located within the assembly line grow pod 100. In addition, the fluid outlet port 362 may be fluidly coupled (e.g., via the water lines 110 or the airflow lines 112) to a fluid destination or delivery component (e.g., a fluid delivery nozzle, an air duct, etc.). The fluid destination or delivery component may also be referred to as an "assembly line grow pod fluid destination" or "assembly line grow pod delivery component" herein, as the fluid destination or delivery component is located within the assembly line grow pod 100. It should be understood that the use of the term "inlet" and "outlet" herein is merely illustrative, as the pumping mechanism 360 may be configured to reverse direction, thereby reversing the direction of fluid flow through the fluid inlet port 364 and the fluid outlet port 362 in some embodiments. This fluid coupling of the fluid outlet port 362 and the fluid inlet port 364 allows the pump 150 to be installed at any location within the assembly line grow pod 100, as described in greater detail herein.

In operation, the pump 150 may receive one or more signals and/or data from the valve control module 300 and/or another module, determine various pump parameters (e.g., flow rate, direction of flow, capacity, pressure of fluid provided, type of fluid provided, distance from fluid source and/or fluid delivery component, etc.) from the signals and/or data, and direct the pumping mechanism 360 to operate accordingly by drawing fluid in via the fluid inlet port 364 and pushing fluid out via the fluid outlet port 362. The signals and/or data may be received from the valve control module 300 continuously, at particular intervals, only when operation of the pump 150 is needed, and/or the like.

The pressure valve 180 may be communicatively coupled to the valve control module 300 via the communications network 350 such that the valve control module 300 can transmit signals to the pressure valve 180. That is, the valve control module 300 may transmit signals to the pressure valve 180 that direct an actuator to twist the adjusting screw 396 to increase or decrease the tension of the biasing assembly 390 (FIG. 3A) to ensure a precise pressure of the fluid that is allowed to move through the pressure valve (e.g., from the fluid inlet 384 to the fluid outlet 385), as described herein. For example, the valve control module 300 may transmit a tension increase signal, a tension decrease signal, and/or the like to the pressure valve 180 to cause the pressure valve 180 to function accordingly. It should be understood that the hardware components within the body 380 of the pressure valve 180 may be configured to complete all of the processes described herein with respect to the valve control module 300, such that, in the event that the valve control module 300 is hot swappable and swapped out of the master controller 160 (FIG. 1B), the various components within the body 380 can be utilized to control the various pressure control processes described herein.

Referring to FIGS. 1A and 3B, both the fluid inlet 384 and the fluid outlet 385 may be fluidly coupled to one or more of the water lines 110 or one or more of the airflow lines 112. As such, fluid from the water lines 110 or airflow lines 112 coupled to the fluid inlet 384 may be received by the pressure valve 180 and ejected out of the water lines 110 or airflow lines 112 coupled to the fluid outlet 385, as described in greater detail herein. As such, the fluid inlet 384 may generally be fluidly coupled (via the water lines 110 or the airflow lines 112) to a fluid source (e.g., the fluid holding tanks 209 depicted in FIG. 2). In addition, the fluid outlet 385 may be fluidly coupled (via the water lines 110 or the airflow lines 112) to a fluid delivery component (e.g., a fluid delivery nozzle, an air duct, etc.). Either the fluid inlet 384 or the fluid outlet 385 may further be fluidly coupled via the water lines 110 or the airflow lines 112 to a pump 150 such that the pump 150 moves fluid through the pressure valve 180. It should be understood that while FIG. 3B depicts a single fluid inlet 384 and a single fluid outlet 385 in the pressure valve 180, the present disclosure is not limited to such.

In operation, the pressure valve 180 may receive a signal from the valve control module 300 (and/or another component of the master controller 160) and direct adjustment of components (e.g., the adjusting screw 396 (FIG. 3A)) in response as necessary to ensure a precise fluid pressure. In embodiments where the valve control module 300 is non-operational (e.g., it has been hot swapped out of the master controller 160), the pressure valve 180 may receive various signals from one or more other components of the assembly line grow pod 100, determine an appropriate positioning of components, and direct component operation accordingly.

While FIG. 3B depicts a single valve control module 300, a single pump 150, and a single pressure valve 180, this is merely illustrative. For example, a single valve control module 300 may be coupled to a plurality of pumps 150 and/or a plurality of pressure valves 180. In another example, a plurality of valve control modules 300 may each be connected to a plurality of pumps 150 and/or pressure valves 180. Other combinations of valve control modules 300, pumps 150, and pressure valves 180 are included within the scope of the present disclosure.

Figure 4:
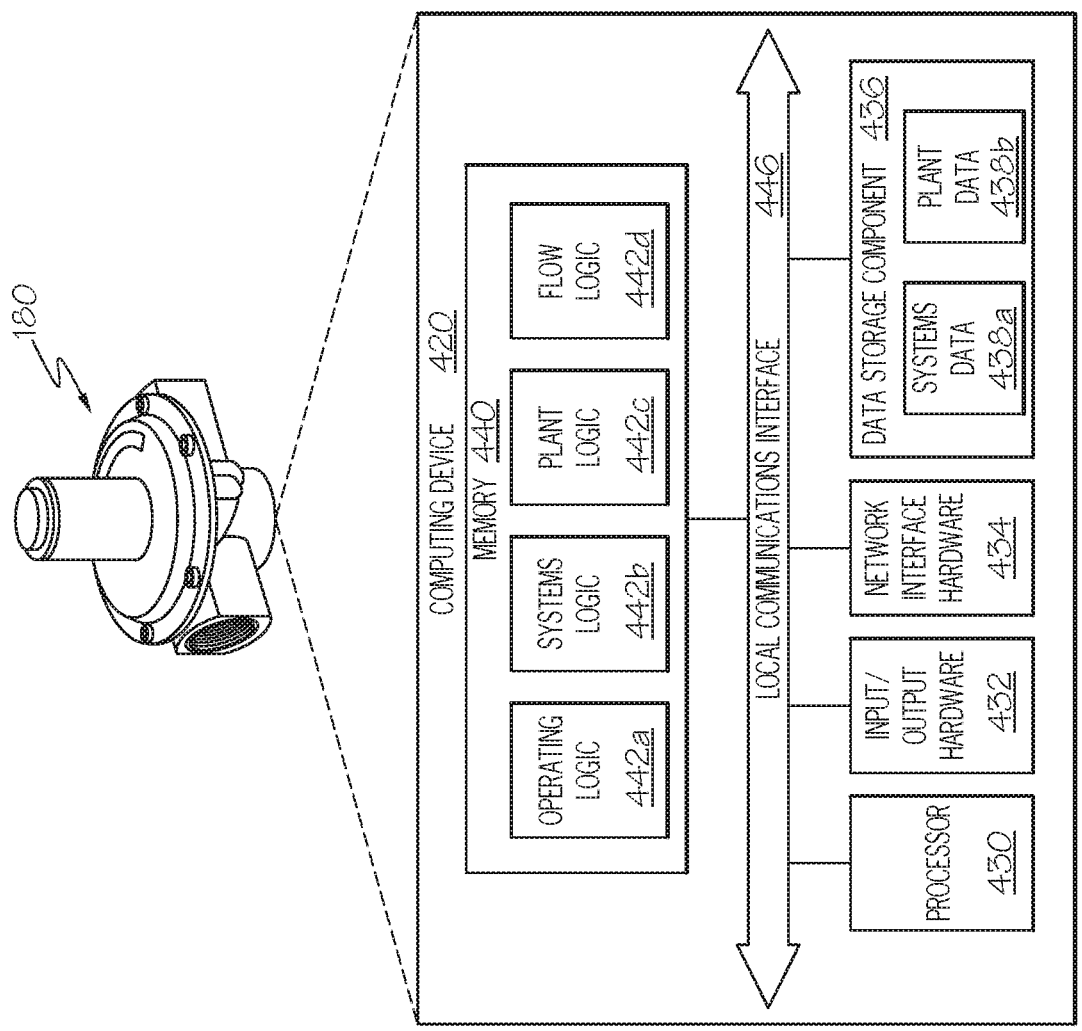
FIG. 4 depicts an illustrative computing environment within a housing of a pressure valve according to one or more embodiments shown and described herein.

FIG. 4 depicts an illustrative computing environment within the pressure valve 180, particularly the body 380 of the pressure valve 180, according to one or more embodiments. However, as previously described herein, the components depicted in FIG. 4 may also be located within the valve control module 300 (FIG. 3B) in some embodiments. As illustrated in FIG. 4, the pressure valve 180 may include a computing device 420. The computing device 420 includes a memory component 440, a processor 430, input/output hardware 432, network interface hardware 434, and a data storage component 436 (which stores systems data 438a, plant data 438b, and/or other data).

At least a portion of the components of the computing device 420 may be communicatively coupled to a local interface 446. The local interface 446 is generally not limited by the present disclosure and may be implemented as a bus or other communications interface to facilitate communication among the components of the pressure valve 180 coupled thereto.

The memory component 440 may be configured as volatile and/or nonvolatile memory. As such, the memory component 440 may include random access memory (including SRAM, DRAM, and/or other types of RAM), flash memory, secure digital (SD) memory, registers, compact discs (CD), digital versatile discs (DVD), Blu-Ray discs, and/or other types of non-transitory computer-readable mediums. Depending on the particular embodiment, these non-transitory computer-readable mediums may reside within the pressure valve 180 and/or external to the pressure valve 180. The memory component 440 may store, for example, operating logic 442a, systems logic 442b, plant logic 442c, flow logic 442d, and/or other logic. The operating logic 442a, the systems logic 442b, the plant logic 442c, and flow logic 442d may each include a plurality of different pieces of logic, at least a portion of which may be embodied as a computer program, firmware, and/or hardware, as an example.

The operating logic 442a may include an operating system and/or other software for managing components of the pressure valve 180. As described in more detail below, the systems logic 442b may monitor and control operations of one or more of the various other control modules and/or one or more components of the assembly line grow pod 100 (FIG. 1A). Still referring to FIG. 4, the plant logic 442c may be configured to determine and/or receive a recipe for plant growth and may facilitate implementation of the recipe via the systems logic 442b and/or the flow logic 442d. The flow logic 442d may be configured to determine a tension of the biasing assembly of the pressure valve 180 to ensure a particularly biasing force that will result in a specific fluid pressure necessary to overcome the biasing force such that the fluid pressure is increased or decreased according to a recipe and/or a need for a particular fluid pressure at a particular location at a particular time, determine an amount of time to maintain a particular biasing force, transmit signals and/or data to various other valves or pressure valves, and/or the like.

It should be understood that while the various logic modules are depicted in FIG. 4 as being located within the memory component 440, this is merely an example. For example, the systems logic 442b, the plant logic 442c, and the flow logic 442d may reside on different computing devices. That is, one or more of the functionalities and/or components described herein may be provided by a user computing device, a remote computing device, and/or another control module that is communicatively coupled to the pressure valve 180.

Additionally, while the computing device 420 is illustrated with the operating logic 442a, the systems logic 442b, the plant logic 442c, and the flow logic 442d as separate logical components, this is also an example. In some embodiments, a single piece of logic (and/or or several linked modules) may cause the computing device 420 to provide the described functionality.

The processor 430 (which may also be referred to as a processing device) may include any processing component operable to receive and execute instructions (such as from the data storage component 436 and/or the memory component 440). Illustrative examples of the processor 430 include, but are not limited to, a computer processing unit (CPU), a many integrated core (MIC) processing device, an accelerated processing unit (APU), and a digital signal processor (DSP). In some embodiments, the processor 430 may be a plurality of components that function together to provide processing capabilities, such as integrated circuits (IC) (including field programmable gate arrays (FPGA), application-specific integrated circuits (ASIC)) and the like.

The input/output hardware 432 may include and/or be configured to interface with microphones, speakers, a display, and/or other hardware. That is, the input/output hardware 432 may interface with hardware that provides a user interface or the like. For example, a user interface may be provided to a user for the purposes of adjusting settings (e.g., an amount of nutrients/water to be supplied, a type and amount of ambient air conditions to be supplied, etc.), viewing a status (e.g., receiving a notification of an error, a status of a particular valve or other component, etc.), and/or the like.

The network interface hardware 434 may include and/or be configured for communicating with any wired or wireless networking hardware, including an antenna, a modem, LAN port, wireless fidelity (Wi-Fi) card, WiMax card, ZigBee card, Z-Wave card, Bluetooth chip, USB card, mobile communications hardware, and/or other hardware for communicating with other networks and/or devices. From this connection, communication may be facilitated between the pressure valve 180 and other components of the assembly line grow pod 100 (FIG. 1A), such as, for example, other control modules, the seeder component, the harvesting component, the watering component, the one or more pumps, and/or the like. In some embodiments, the network interface hardware 434 may also facilitate communication between the pressure valve 180 and components external to the assembly line grow pod 100 (FIG. 1A), such as, for example, user computing devices and/or remote computing devices.

Still referring to FIG. 4, the pressure valve 180 may be coupled to a network (e.g., the communications network 350 (FIG. 3B)) via the network interface hardware 434. As previously described herein, various other control modules, other computing devices, and/or the like may also be coupled to the network. Illustrative other computing devices include, for example, a user computing device and a remote computing device. The user computing device may include a personal computer, laptop, mobile device, tablet, server, etc. and may be utilized as an interface with a user. As an example, a user may send a recipe to the computing device 420 for at least a partial implementation by the pressure valve 180. Another example may include the pressure valve 180 sending notifications to a user of the user computing device.

Similarly, the remote computing device may include a server, personal computer, tablet, mobile device, etc. and may be utilized for machine to machine communications. As an example, if the assembly line grow pod 100 (FIG. 1A) determines a type of seed being used (and/or other information, such as ambient conditions), the computing device 420 may communicate with the remote computing device to retrieve a previously stored recipe for those conditions. As such, some embodiments may utilize an application program interface (API) to facilitate this or other computer-to-computer communications.

Still referring to FIG. 4, the data storage component 436 may generally be any medium that stores digital data, such as, for example, a hard disk drive, a solid state drive (SSD), Optane® memory (Intel Corporation, Santa Clara Calif.), a compact disc (CD), a digital versatile disc (DVD), a Blu-Ray disc, and/or the like. It should be understood that the data storage component 436 may reside local to and/or remote from the pressure valve 180 and may be configured to store one or more pieces of data and selectively provide access to the one or more pieces of data. As illustrated in FIG. 4, the data storage component 436 may store systems data 438*a*, plant data 438*b*, and/or other data.

The systems data 438*a* may generally include data relating to the functionality of the pressure valve 180, such as stored settings, information regarding the location of the pressure valve 180, functionality of various components of the pressure valve 180, and/or the like. The plant data 438*b* may generally relate to recipes for plant growth, settings of various components within the assembly line grow pod 100 (FIG. 1A), data relating to control of the pressure valve 180, sensor data relating to a particular tray or cart, and/or the like.

It should be understood that while the components in FIG. 4 are illustrated as residing within the pressure valve 180, this is merely an example. In some embodiments, one or more of the components may reside external to the pressure valve 180, such as within the valve control module 300 (FIG. 3B). It should also be understood that, while the pressure valve 180 is illustrated as a single device, this is also merely an example. That is, the pressure valve 180 may be a plurality of devices that are communicatively coupled to one another and provide the functionality described herein.

Figure 5:
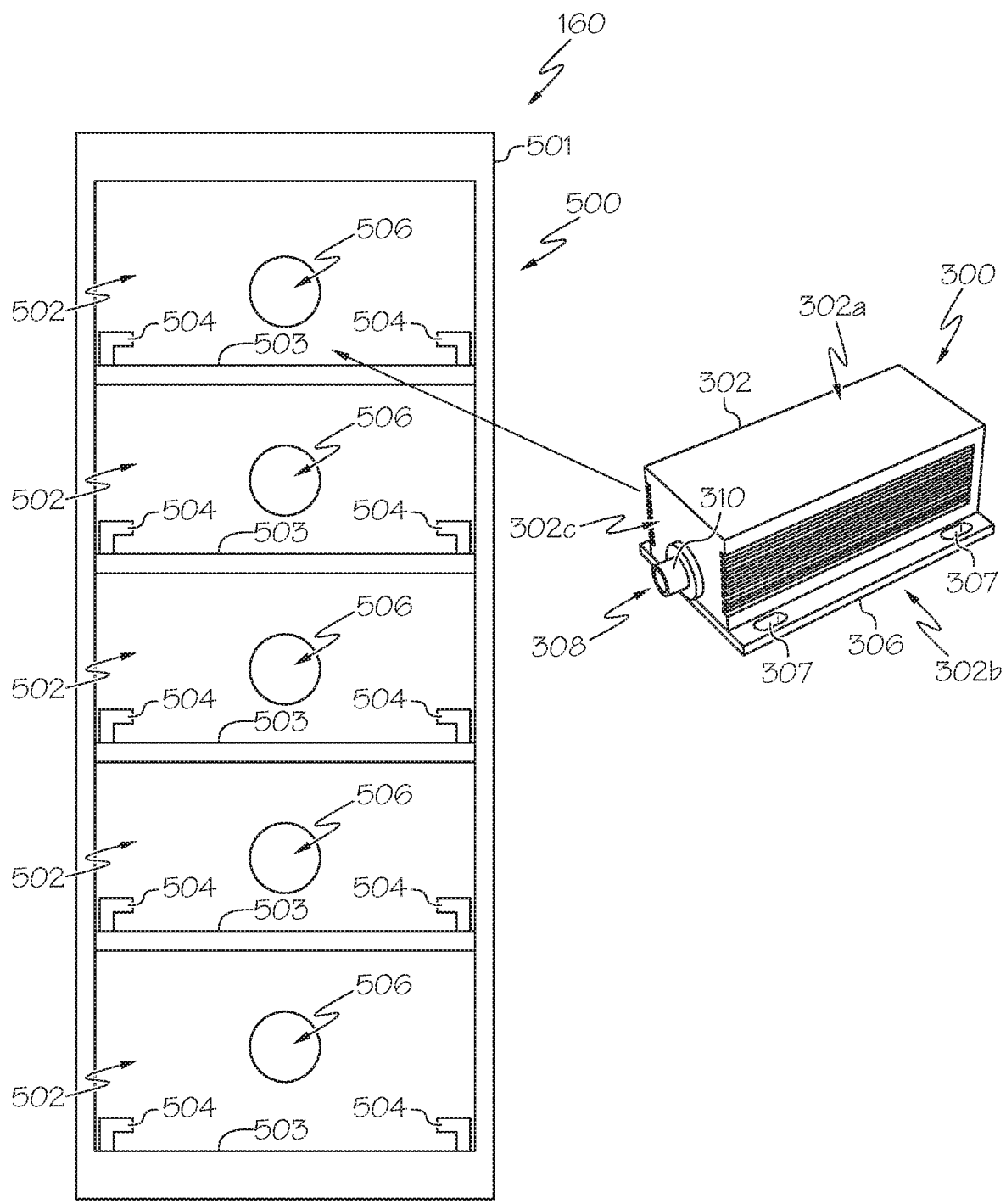
FIG. 5 schematically depicts an illustrative modular control interface of a master controller that receives a valve control module according to one or more embodiments shown and described herein.

FIG. 5 schematically depicts an illustrative modular control interface 500 of a master controller 160 that receives a valve control module 300 according to various embodiments. As illustrated, the master controller 160 may be configured with a modular control interface 500 that can support the valve control module 300 and/or one or more other control modules. As such, the master controller 160 may include a plurality of bays 502 in which the valve control module 300 can be placed. Each bay 502 is generally a cavity within a body 501 of the master controller 160 that is sized and shaped to receive any control module, including the valve control module 300. In addition, each bay 502 may have the same or substantially similar shape and size as the other bays 502 of the master controller 160 such that the valve control module 300 and/or other modules can be inserted in any bay 502. That is, no bay 502 is particularly shaped to only accept the valve control module 300 and there is no bay that cannot accept the valve control module 300.

Figure 6:
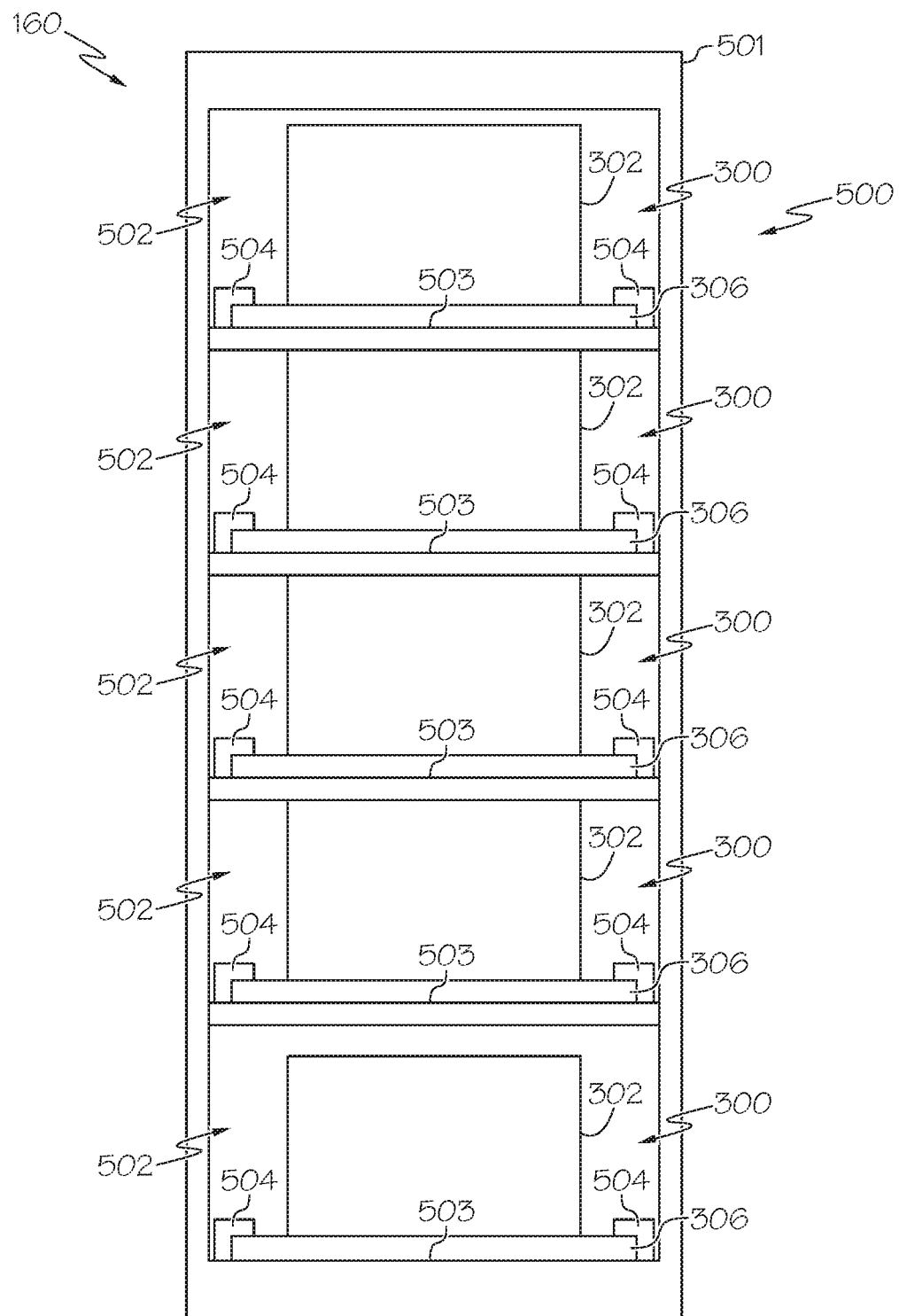
FIG. 6 schematically depicts an illustrative master controller holding a plurality of illustrative control modules according to one or more embodiments shown and described herein.

At least some of the plurality of bays 502 may further include a floor 503 and/or a support mechanism 504. The floor 503 may generally be a lower surface of each bay 502 that supports the valve control module 300 when placed therein. As such, each floor 503 may be part of the body 501 of the master controller 160. In some embodiments, the support mechanism 504 may be a rail or the like that supports the base 306 of the valve control module 300 when the valve control module 300 is inserted into a respective bay. In addition, the support mechanism 504 may also act as a guide to ensure that the valve control module 300 is appropriately inserted and positioned within the bay 502. For example, as depicted in FIG. 6, at least some of the support mechanisms 504 in each bay 502 accepts the corresponding base 306 of the valve control module 300 such that the valve control module 300 slides into the bay 502 in the correct positioning and ensures that the I/O port 308 is appropriately positioned, as described hereinbelow.

Referring again to FIG. 5, the support mechanisms 504 may further be arranged, shaped, and sized to hold the valve control module 300 in place when the valve control module 300 is placed within a bay 502 in some embodiments. In addition, the support mechanisms 504 may further be molded to receive a securing device to secure the valve control module 300 within the bay 502 (e.g., clips, bolts, screws, and/or the like that are inserted into the apertures 307 in the base 306 and affixed to (or integrated with) the support mechanisms 504). It should be understood that the particular arrangement and configuration of the support mechanisms 504 and the bases 306 are merely illustrative, and other means of ensuring that the valve control module 300 is appropriately placed and positioned within the bay 502 are possible without departing from the scope of the present disclosure.

Still referring to FIG. 5, at least a portion of the plurality of bays 502 may further include a bay I/O port 506. The bay I/O port 506 may correspond to the I/O port 308 of the valve control module 300 such that the bay I/O port 506 and the I/O port 308 of the valve control module 300 can be matingly coupled together. For example, the bay I/O port 506 may be shaped and/or sized to correspond to the body 310 of the I/O port 308 such that the I/O port 308 is insertable within the bay I/O port 508 (e.g., the bay I/O port 506 is generally the same or substantially similar shape and slightly larger than the body 310 of the I/O port 308).

In embodiments, the bay I/O port 506 may contain various communications components such that, when the bay I/O port 506 is mated to the I/O port 308 of the valve control module 300, communications between the valve control module 300 and other devices communicatively coupled via the bay I/O port 506 can occur. For example, the bay I/O port 506 may allow the valve control module 300 to send and/or receive transmissions to/from the various other control modules and/or one or more components of the assembly line grow pod 100 (FIG. 1A) via the I/O port 308.

The circuitry contained within each of the bay I/O ports 506 may be communicatively coupled to various other components of the master controller 160 such that signals, data, and/or the like can be transmitted to the master controller 160, other control modules, and/or one or more components of the assembly line grow pod 100 (FIG. 1A) by the valve control module 300 when the valve control module 300 is inserted in one of the bays 502 of the master controller 160 and the bay I/O port 506 and the I/O port 308 are coupled together.

Figure 7:
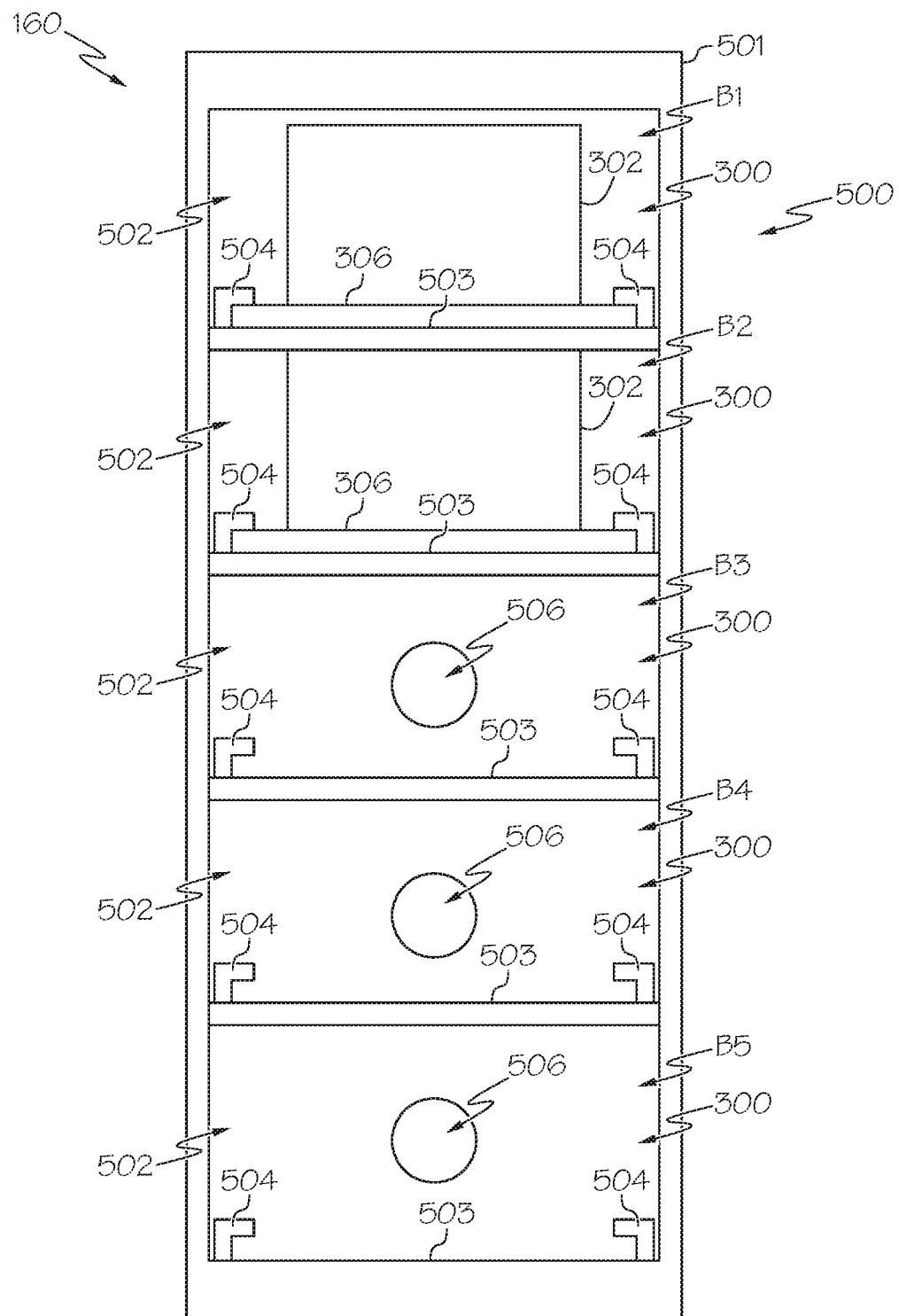
FIG. 7 schematically depicts an illustrative master controller holding a plurality of illustrative control modules and having a plurality of empty bays according to one or more embodiments shown and described herein.

Since at least some of the bays 502 are identical (or substantially similar) in shape and size and contain similar components (e.g., floors 503, support mechanisms 504, and bay I/O ports 506), the valve control module 300 can be placed in any one of the bays 502 in order to operate. Certain bays 502 may remain vacant and ready to accept any control module, as depicted in FIG. 7.

It should be understood that the various components of the master controller 160 described herein allow the valve control module 300 (in addition to other control modules) to be hot swappable (which may also be referred to herein as "removably insertable") within the master controller 160. That is, the valve control module 300 can be inserted into a bay 502 of the master controller 160 at any time to function. Furthermore, removal of the valve control module 300 from a bay 502 will not alter the functionality of other control modules inserted in other bays 502. As such, a user may remove the valve control module 300 from a bay 502 at any time without altering the functionality of the remaining installed control modules. Similarly, another control module may be removed while the valve control module 300 remains in a bay 502 and the valve control module 300 will continue to function as described herein. This may be particularly useful in situations where it may be necessary to remove a control module from a bay 502 without shutting down the entire assembly line grow pod 100 (FIG. 1A) to do so.

It should also be understood that the master controller 160 need not have all of the bays 502 filled with a control module to operate the assembly line grow pod 100. For example, as particularly shown in FIG. 7, a portion of the bays 502 may be "filled" bays (e.g., containing a control module such as the valve control module 300), such as bays B1, B2, and B4. Likewise, a portion of the bays 502 may be "empty" bays (e.g., not containing a control module), such as bays B3 and B4. Even with empty bays B3 and B4, the master controller 160 may still be able to provide all of the functionality for the assembly line grow pod 100 (FIG. 1A), as described herein. Empty bays B3 and B4 may be used to insert future control modules, such as modules that control additional components that are added to the assembly line grow pod 100 (FIG. 1A) and/or modules that increase the efficiency of operation of the assembly line grow pod 100.

Figure 8:
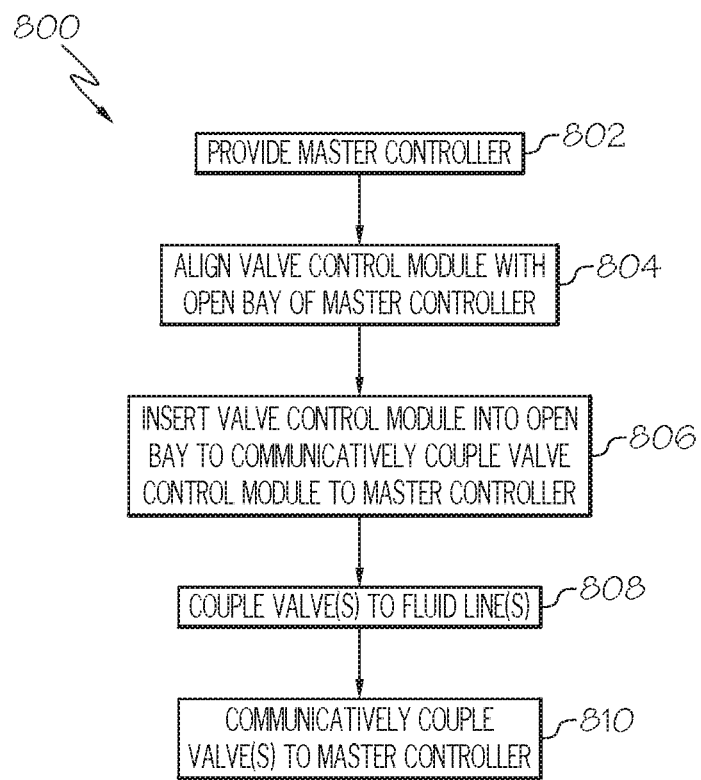
FIG. 8 depicts a flow diagram of an illustrative method of providing a valve control module for a modular control interface and providing one or more pumps and pressure valves according to one or more embodiments shown and described herein.

FIG. 8 depicts a flow diagram of an illustrative method of providing a valve control module for a modular control interface and for providing one or more pressure valves, generally designated 800, according to various embodiments. Referring also to FIGS. 1A-5, the method 800 includes providing the assembly line grow pod 100 with the master controller 160 at block 802. At block 804, a valve control module 300 is aligned with an open bay 502 of the master controller 160, as described in greater detail herein. Accordingly, the valve control module 300 is inserted within the open bay 502 of the master controller 160 so as to be communicatively coupled with the master control module at block 806, as described in greater detail herein.

At block 808, the one or more pressure valves 180 may be coupled to one or more fluid lines, including the one or more water lines 110 and the one or more airflow lines 112. For example, the one or more water lines 110 or the one or more airflow lines 112 within the assembly line grow pod 100 may be coupled to the one or more pressure valves 180 in such a manner that a pressure valve 180 receives fluid from a first particular location and selectively controls movement of the fluid to a second particular location (e.g., by only allowing fluid having a particular pressure to pass to the second particular location). More specifically, a pressure valve 180 may be coupled between the watering component 109 and a water delivery location with a pump 150 positioned between the watering component 109 and the pressure valve.

A water line 110 may be coupled from the watering component 109 to the pump 150, a second water line 110 coupled between the pump 150 and the pressure valve 180 (e.g., connecting the fluid inlet 384 of the pressure valve 180 to the water line 110) and a third water line 110 may be coupled from the pressure valve 180 (e.g., connecting the fluid outlet 385 of the pressure valve 180 to the other water line 110) to the water delivery location. The relative distances between a fluid source, the pump 150, the pressure valve 180, and a fluid destination via the fluid lines (e.g., the water lines 110 and the airflow lines 112) is not limited by this disclosure, and the pressure valve 180 may be placed at any location that allows the pressure valve 180 to selectively restrict movement of fluid, as described herein. For example, it may be advantageous to include the pressure valve 180 nearer to the fluid source or nearer to the fluid destination depending on the characteristics of the fluid, the distance between the fluid source and the fluid destination, the location of other pumps, valves, or pressure valves, the location of fluid lines (e.g., a plurality of fluid lines that are received by the fluid source and/or the fluid destination), and/or the like.

In some embodiments, coupling the pressure valve 180 according to block 808 may include placing a plurality of pressure valves 180 in series on a fluid line between the fluid source and the fluid destination. Such a coupling of a plurality of pressure valves 180 in series may be completed, for example, to provide a stepwise pressurization of fluid. However, other advantages should also be recognized.

In some embodiments, coupling the pressure valve 180 according to block 808 may include placing a plurality of pressure valves 180 in parallel on a plurality of fluid lines between the fluid source and the fluid destination. Such a coupling of a plurality of pressure valves 180 in parallel may be completed, for example, to selectively provide varying pressures of fluid between a fluid source and a fluid destination at substantially the same time, to provide additional fluid paths when a relatively larger amount of pressurized fluid is needed, to provide fewer fluid paths when a relatively smaller amount of fluid is needed, and/or the like. Other advantages should also be recognized.

In some embodiments, coupling the pressure valve 180 according to block 808 may also be completed such that the pressure valve 180 is coupled relative to other components of the assembly line grow pod 100. For example, to ensure that fluid is received such that it can be routed in a particular direction, a pressure valve 180 may be coupled with or adjacent to one or more pumps 150 that are used for pumping and/or pressurizing the fluid. In some embodiments, coupling the pressure valve 180 according to block 808 may be completed according to certain characteristics of the assembly line grow pod 100 and/or components thereof. For example, if a main water line 110 extends from a fluid source and a plurality of fluid destinations are present, at least one pressure valve 180 may be positioned at the main water line 110 and/or at a branch water line 110 between the main water line 110 and water lines 110 traveling to each fluid destination so as to selectively provide pressurized fluid from the main water line 110 to the fluid destinations.

At block 810, each of the installed pressure valves 180 within the assembly line grow pod 100 may be communicatively coupled to the master controller 160, particularly the valve control module 300 therein. As previously described herein, the pressure valves 180 (and/or a portion thereof, such as the hardware components within the body 380) may be communicatively coupled (either via a wired or wireless connection) to the valve control module 300 (e.g., via the network interface hardware 434 of the pressure valve 180 and a similar component within the valve control module 300). In some embodiments, the pressure valves 180 may be directly coupled to the valve control module 300. In other embodiments, the pressure valves 180 may be coupled to the valve control module 300 via a network (e.g., communications network 350).

In embodiments including a series of pressure valves 180 (e.g., a plurality of pumps fluidly coupled in series to one another via fluid lines), each pressure valve 180 may be communicatively coupled in series to the valve control module 300 such that a first pressure valve 180 is communicatively coupled to the valve control module 300, a second pressure valve 180 is communicatively coupled to the first pressure valve 180, and so on. In addition, when a plurality of pressure valves 180 are arranged in series on a fluid line, the pressure valves 180 may be communicatively coupled to the valve control module 300 such that the valve control module 300 can control simultaneous (or substantially simultaneous) operation of the pressure valves 180 to ensure an effective series pressure valve control. For example, the valve control module 300, a first pressure valve 180, and a second pressure valve 180 (which are arranged in series) may be communicatively coupled such that the valve control module 300 transmits one or more signals to cause an opening/closing of the first pressure valve 180, which opens/closes accordingly and results in a second signal transmitted to the second pressure valve 180 (either from the first pressure valve 180 or the valve control module 300) to open/close in accordance with as the first pressure valve 180, opposite to the open/close setting of the first pressure valve 180, and/or the like to effectively direct fluid movement.

Figure 9:
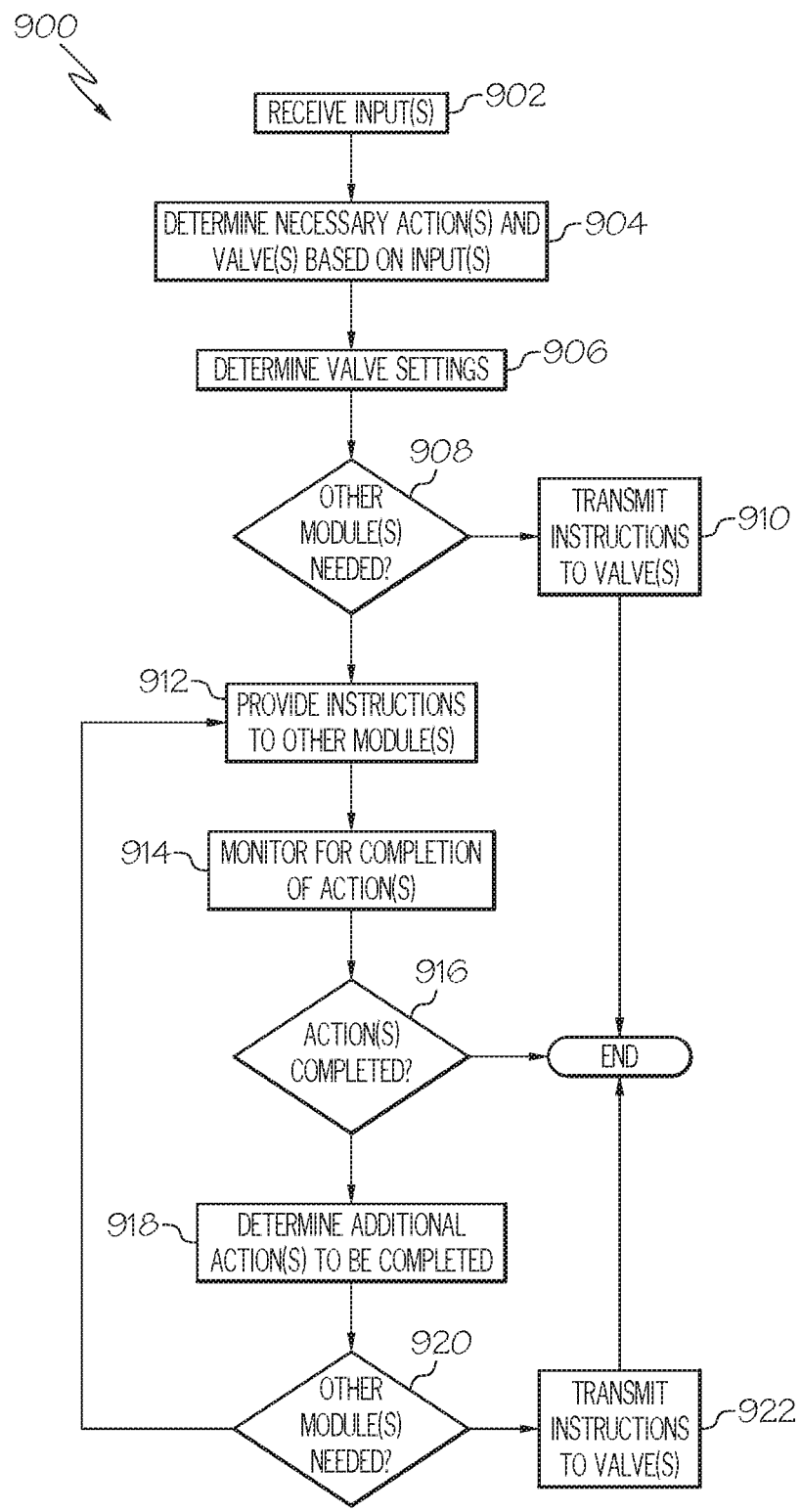
FIG. 9 depicts a flow diagram of an illustrative method of operating one or more pumps and pressure valves in an assembly line grow pod with a master controller according to one or more embodiments shown and described herein.

Once inserted within the master controller 160, the valve control module 300 may complete one or more processes to operate the assembly line grow pod 100 and/or a component thereof, (e.g., operate the one or more pressure valves 180). FIG. 9 depicts a flow diagram of an illustrative method of operating an assembly line grow pod 100 with a master controller 160 (e.g., with a valve control module 300 within the master controller 160), generally designated 900, according to one or more embodiments. While FIG. 9 relates to operation of the master controller 160, it should be understood that the various processes may be completed by one or more control modules within the master controller 160 (e.g., the valve control module 300) and/or by the various internal components within each pressure valve 180 (e.g., components within the body 380 of the pressure valve 180). At block 902, the master controller 160 may receive one or more inputs.

The one or more inputs may generally contain information regarding fluid movement within the assembly line grow pod. For example, the master controller 160 may receive a command from a user, data from one or more sensors, an input from another control device, and/or the like. Illustrative examples of one or more inputs include, but are not limited to, inputs that relate to commands to open or close a particular pressure valve 180 at a particular time, inputs that relate to commands to carry out a particular recipe as it pertains to directing fluid flow, inputs that relate to commands to change various pressure valve settings, sensor inputs from various sensors regarding the status of the assembly line grow pod 100, components thereof, and/or plants growing within the grow pod, inputs relating to commands from other control devices, and/or the like.

At block 904, the master controller 160 determines the necessary actions to be completed and which of the one or more pressure valves 180 are to be used based on the inputs that were received at block 902. The actions may generally be one or more instructions, signals (e.g., control signals), or the like for operation of the one or more pressure valves 180 (e.g., opening or closing one or more inlets and/or one or more outlets, and/or the like).

For example, if the input relates to a command to start placement of seeds on a particular tray, the master controller 160 may determine that the actions include transmitting one or more signals to the pressure valves that pressurize water that is to be supplied to watering devices located adjacent to a track so that the watering devices have precisely pressurized water to supply to the new seeds when the seeds pass the watering devices on the track after placement without overwatering the seeds, under-watering the seeds, causing the seeds to slip out of a cell in which they are placed, and/or the like. In some embodiments, such actions may also be completed by a plurality of control modules located within the master controller 160. For example, a seeder control module may be inserted in a bay 502 of the master controller 160, and thus an action that corresponds to supplying water to a watering device after seed placement may optionally be controlled by the seeder control module in addition to the valve control module 300.

At block 906, various settings may be determined by the master controller 160. That is, the type of pressure valve 180, the functionality of the pressure valve 180, the location of the pressure valve 180, location of adjacent pressure valves 180, direction of fluid lines extending to and from the pressure valve 180, various pressure valve 180 parameters (e.g., range of tension achievable by the biasing assembly, type of biasing assembly, configuration of stopper, type of actuator, etc.) may be determined for the purposes of determining how the pressure valve 180 will be used to pressurize fluid.

For example, the type of pressure valve (e.g., water valve, compressed air valve, etc.) may be determined for the purposes of determining the type of fluid to be directed. The location of the pressure valve 180 and/or the location of adjacent pressure valves 180 may be determined for the purposes of determining where in the assembly line grow pod 100 fluid can be pressurized and/or where pressurized fluid can be delivered. As a result of determining pressure valve settings, the master controller 160 can determine how best to utilize a particular pressure valve 180 to complete various tasks for pressurizing fluid within the assembly line grow pod 100.

In addition to determining pressure valve settings for the purposes of utilizing particular pressure valves 180, the master controller 160 may determine whether other module(s) for controlling actions are needed in addition to the valve control module 300 at block 908. Such a determination may be completed, for example, by recognizing certain module(s) that can complete a particular action that may work in conjunction with the valve control module 300 and/or the pressure valves 180 to complete an action. For example, a pump control module and/or one or more pumps 150 may be used in conjunction with the valve control module 300 and/or one or more pressure valves 180 to initiate, increase, decrease, or stop fluid flow, pressurize fluid, and/or the like.

In some embodiments, the determination at block 908 may also include determining whether particular other modules within the master controller 160 are available. If no other module(s) are needed or available to control the actions, the process may continue at block 910. If other module(s) are needed or available to control the actions, the process may continue at block 912.

At block 910, the master controller 160 (and/or the valve control module 300 therein) may transmit instructions to the pressure valve(s) 180 and no other module(s) are needed or available to complete the actions. More specifically, the master controller 160 may transmit instructions corresponding to operation of the pressure valve(s) 180 that will result in pressurization of fluid as needed. As a result, each pressure valve 180 that receives the instructions from the master controller 160 may direct movement of the various pressure valve components as described herein.

At block 912, instructions are provided to the other module(s) (e.g., other than the valve control module 300) for carrying out the determined action(s). For example, the master controller 160 may transmit one or more signals to the other module(s), where the one or more signals correspond to the command. That is, if a pump needs to be operated (e.g., to move fluid and/or assist in pressurizing fluid) in conjunction with operation of a particular pressure valve, the master controller 160 may transmit one or more signals to a pump control module such that the pump control module directs operation of the pump and causes the pressure valve(s) 180 to function as described herein.

In addition, the master controller 160 may monitor one or more portions of the assembly line grow pod 100 to ensure the action(s) are completed by the other modules and/or components of the assembly line grow pod 100 at block 914. That is, the master controller 160 may receive signals and/or data from sensors, from portions of the assembly line grow pod 100, from the control modules, and/or the like that are indicative of whether the action(s) were completed.

For example, if an action included adjusting a particular pressure valve 180 to ensure a particular pressurization of the fluid exiting the pressure valve 180, the master controller 160 may receive sensor data from sensors at the pressure valve 180 or downstream from the pressure valve 180, where the sensor data indicates whether a pressure of the water from the pressure valve 180 is the particular pressure required. Data indicating the pressure of the water may be used by the master controller 160 to determine that the pressure valve 180 was or was not appropriately adjusted. As such, the master controller 160 may determine at block 916 whether the action(s) were completed. If the actions were completed, the process may end. If the actions were not completed, the process may proceed to block 918.

At block 918, the master controller 160 may determine additional action(s) to be completed. These additional actions may generally be actions to replace those that were not completed above. As such, the action(s) may be the same or substantially similar (e.g., transmitting a signal to a pressure valve corresponding to a command to adjust the pressure valve) in some embodiments. However, the actions may also be different in other embodiments (e.g., transmitting a signal to one or more pumps and/or one or more other pressure valves).

For example, new actions may be determined if only a portion of the actions were carried out. In another example, new alternative actions may be determined if the failure to carry out an action was due to a faulty component, thus necessitating the need for a redundant system to carry out particular actions. Accordingly, the master controller 160 may determine again whether these new actions are to be completed by other control modules within the master controller 160. If so, the process may repeat at block 912. If not, the master controller 160 may complete the actions at block 922 (e.g., transmit instructions to one or more pressure valves and/or the like) and the process may end.

As illustrated above, various embodiments for providing one or more pressure valves and for providing a valve control module for a modular control interface in an assembly line grow pod are disclosed. These embodiments create a particular pressure valve system that is adapted to precisely pressurize fluid within an assembly line grow pod in an accurate and controlled manner so as to ensure that precise placement of fluid (including water, nutrients, and ambient air conditions) is achieved to ensure accurate growth of plants growing inside the assembly line grow pod.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein include systems, methods, and non-transitory computer-readable mediums for providing a valve control module for a modular control interface in an assembly line grow pod and for providing one or more pressure valves within an assembly line grow pod for the purposes of pressurizing/depressurizing fluid within the assembly line grow pod. It should also be understood that these embodiments are merely exemplary and are not intended to limit the scope of this disclosure.

What is claimed is:

1. An assembly line grow pod comprising:
a plurality of fluid lines fluidly coupled between a fluid source and a fluid destination within the assembly line grow pod, the fluid destination comprising plant material;
a plurality of pressure valves, at least one pressure valve of the plurality of pressure valves comprising:
a fluid inlet fluidly coupled to the fluid source via one of the plurality of fluid lines,
a fluid outlet fluidly coupled to the fluid destination via another one of the plurality of fluid lines,
a stopper disposed between the fluid inlet and the fluid outlet, the stopper movable between an engaged position to cause fluid flow between the fluid inlet and the fluid outlet is restricted by the stopper and a disengaged position to cause fluid flow is substantially free to move between the fluid inlet and the fluid outlet,
a biasing assembly coupled to the stopper such that the biasing assembly applies a biasing force on the stopper to bias the stopper in the engaged position or in the disengaged position,
an adjusting screw coupled to the biasing assembly and movable to increase or decrease a tension of the biasing assembly, thus increasing or decreasing the biasing force,
an actuator coupled to the adjusting screw such that the actuator moves the adjusting screw to increase or decrease the biasing force, and
a body comprising a processing device and a non-transitory, processor-readable storage medium, the non-transitory, processor-readable storage medium comprising a plurality of instructions that are executable by the processing device; and a master controller communicatively coupled to the plurality of pressure valves, wherein the master controller is programmed to receive information relating to fluid delivery within the assembly line grow pod, determine one or more pressure valves of the plurality of pressure valves to pressurize the fluid, determine pressure valve parameters for each of the one or more pressure valves that achieve the fluid pressurization, and transmit one or more control signals to the one or more pressure valves for pressurizing the fluid within the assembly line grow pod, wherein the plurality of instructions cause the processing device to receive the one or more control signals from the master controller and cause the actuator to move the adjusting screw, thus increasing or decreasing the biasing force in accordance with the instruction such that a particular amount of fluid is supplied to the plant material.

2. The assembly line grow pod of claim 1, further comprising a valve control module disposed within the master controller, the valve control module comprising one or more hardware components for receiving the information, determining the one or more pressure valves, determining the pressure valve parameters, and transmitting the one or more control signals.

3. The assembly line grow pod of claim 2, wherein the valve control module is removably insertable such that the valve control module is removable from a bay of the master controller without altering a functionality of the plurality of pressure valves within the assembly line grow pod.

4. The assembly line grow pod of claim 2, wherein the valve control module is fixed within a bay of the master controller such that the valve control module is not removable from the master controller.

5. The assembly line grow pod of claim 1, wherein the plurality of fluid lines comprise a plurality of water lines.

6. The assembly line grow pod of claim 1, wherein the plurality of fluid lines comprise a plurality of airflow lines.

7. The assembly line grow pod of claim 1, wherein the master controller is communicatively coupled to the plurality of pressure valves via a communications network.

8. The assembly line grow pod of claim 1, wherein the fluid source includes a fluid holding tank containing one or more of water, a mixture of water and nutrients, nutrients, or gasses.

9. The assembly line grow pod of claim 1, wherein the fluid source includes a watering component that supplies one or more of water and nutrients to plants that are grown in the assembly line grow pod.

10. The assembly line grow pod of claim 1, wherein the fluid destination includes a watering nozzle that supplies water to one or more seed trays supported on a cart within the assembly line grow pod.

11. A pressure valve in an assembly line grow pod, the pressure valve comprising:

a fluid inlet fluidly coupled to an assembly line grow pod pump via a first one or more fluid lines disposed between the fluid inlet and the assembly line grow pod pump;

a fluid outlet fluidly coupled to an assembly line grow pod fluid destination via a second one or more fluid lines disposed between the fluid outlet and the fluid destination, the fluid outlet further fluidly coupled to the fluid inlet, and the fluid destination comprising plant material;

a stopper disposed between the fluid inlet and the fluid outlet, the stopper movable between an engaged position to cause fluid flow between the fluid inlet and the fluid outlet is restricted by the stopper and a disengaged position to cause fluid flow is substantially free to move between the fluid inlet and the fluid outlet;

a biasing assembly coupled to the stopper such that the biasing assembly applies a biasing force on the stopper to bias the stopper in the engaged position or in the disengaged position;

an adjusting screw coupled to the biasing assembly and movable to increase or decrease a tension of the biasing assembly, thus increasing or decreasing the biasing force;

an actuator coupled to the adjusting screw such that the actuator is moves the adjusting screw to increase or decrease the biasing force; and a body comprising:
   a processing device communicatively coupled to the actuator and to a master controller of the assembly line grow pod, and
   a non-transitory, processor-readable storage medium communicatively coupled to the processing device, the non-transitory, processor-readable storage medium comprising one or more instructions thereon that, when executed, cause the processing device to:
      receive an instruction from the master controller, the instruction corresponding to a determined particular amount of fluid to be supplied to the plant material according to a recipe for plant growth, and
      cause the actuator move the adjusting screw, thus increasing or decreasing the biasing force in accordance with the instruction such that the particular amount of fluid is supplied to the plant material.

12. The valve of claim 11, wherein:
the processing device is communicatively coupled to a valve control module of the master controller; and
the one or more instructions that, when executed, cause the processing device to receive the instruction further cause the processing device to receive the instruction from the valve control module of the master controller.

13. The valve of claim 11, wherein the fluid outlet and the fluid inlet are each fluidly coupled to one or more water lines.

14. The valve of claim 11, wherein the fluid outlet and the fluid inlet are each fluidly coupled to one or more airflow lines.

15. The valve of claim 11, wherein the biasing force is adjustable such that a particular pressure of fluid present in the fluid inlet overcomes the biasing force of the biasing assembly.

16. A method of installing a pressure valve in an assembly line grow pod, the method comprising:

providing the assembly line grow pod comprising a fluid source and a fluid destination;

disposing the pressure valve in the assembly line grow pod fluidly coupled between the fluid source and the fluid destination and fluidly coupling the pressure valve to a first fluid line fluidly coupled to the fluid source and a second fluid line fluidly coupled to the fluid destination such that the pressure valve, when operated, selectively controls pressurization of a fluid in the first fluid line and the second fluid line from the fluid source to the fluid destination, wherein the pressure valve comprises:

a fluid inlet fluidly coupled to the fluid source via one of the plurality of fluid lines, a fluid outlet fluidly coupled to the fluid destination via another one of the plurality of fluid lines, and a stopper disposed between the fluid inlet and the fluid outlet, the stopper movable between an engaged position to cause fluid flow between the fluid inlet and the fluid outlet to be restricted by the stopper and a disengaged position to cause fluid flow to be substantially free to move between the fluid inlet and the fluid outlet, a biasing assembly coupled to the stopper such that the biasing assembly applies a biasing force on the stopper to bias the stopper in the engaged position or in the disengaged position, an adjusting screw coupled to the biasing assembly and movable to increase or decrease a tension of the biasing assembly, thus increasing or decreasing the biasing force, an actuator coupled to the adjusting screw such that the actuator moves the adjusting screw to increase or decrease the biasing force, and a body comprising a processing device and a non-transitory, processor-readable storage medium, the non-transitory, processor-readable storage medium comprising a plurality of instructions that are executable by the processing device;

communicatively coupling the pressure valve to a valve control module of a master controller within the assembly line grow pod such that the pressure valve receives the instructions from the valve control module for selectively controlling pressurization of the fluid.

17. The method of claim 16, further comprising:

providing the master controller in the assembly line grow pod; and inserting the valve control module into an open bay of the master controller.

* * * * *